(12) United States Patent
Ankireddipally et al.

(10) Patent No.: US 6,971,096 B1
(45) Date of Patent: Nov. 29, 2005

(54) TRANSACTION DATA STRUCTURE FOR PROCESS COMMUNICATIONS AMONG NETWORK-DISTRIBUTED APPLICATIONS

(75) Inventors: Lakshmi Narasimha Ankireddipally, Sunnyvale, CA (US); Ryh-Wei Yeh, Palo Alto, CA (US); Dan Nichols, Sunnyvale, CA (US); Ravi Devesetti, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/574,335

(22) Filed: May 19, 2000

(51) Int. Cl.$^7$ ................................................. G06F 9/00
(52) U.S. Cl. ........................ 718/101; 707/100; 707/202; 707/204
(58) Field of Search ............... 718/101; 707/100–104.1, 707/202, 204; 709/101

(56) References Cited

U.S. PATENT DOCUMENTS

| | | | | |
|---|---|---|---|---|
| 5,893,108 | A | * 4/1999 | Srinivasan et al. | 707/103 R |
| 5,950,212 | A | * 9/1999 | Anderson et al. | 707/205 |
| 5,956,483 | A | 9/1999 | Grate et al. | 395/200.33 |
| 5,970,472 | A | 10/1999 | Allsop et al. | 705/26 |
| 5,987,429 | A | 11/1999 | Maritzen et al. | 705/31 |
| 5,999,979 | A | 12/1999 | Vellanki et al. | 709/232 |
| 6,009,405 | A | 12/1999 | Leymann et al. | |
| 6,009,464 | A | 12/1999 | Hamilton et al. | 709/219 |
| 6,321,234 | B1 | * 11/2001 | Debrunner | 707/202 |
| 6,457,066 | B1 | 9/2002 | Mein et al. | 709/330 |
| 6,463,456 | B1 | 10/2002 | Kan et al. | |
| 6,507,856 | B1 | * 1/2003 | Chen et al. | 715/513 |
| 6,529,921 | B1 | * 3/2003 | Berkowitz et al. | 715/500.1 |
| 6,714,962 | B1 | 3/2004 | Helland et al. | |
| 6,721,793 | B1 | 4/2004 | Corless | |
| 6,785,722 | B2 | 8/2004 | Vuong et al. | |
| 2002/0194242 | A1 | 12/2002 | Chandrasekaran et al. | |

OTHER PUBLICATIONS

Opentag and TMX: XML in the Localization Industry, by William Burns and Walter Smith, ILE Corporation (pp. 137–142).

(Continued)

*Primary Examiner*—Meng-Al T. An
*Assistant Examiner*—Phuong N. Hoang
(74) *Attorney, Agent, or Firm*—Bobby K. Truong; Hickman Palermo Truong & Becker LLP

(57) ABSTRACT

A process automation application, referred to as a commerce exchange server, for sending transaction messages between application programs uses a transaction definition data structure for specifying the component operations and processing logic that comprise the transaction. The data structure specifies one or more operations that constitute the transaction, instructions for producing the input data needed for each operation, and conditional logic for specifying constraints on the sequence of operation execution. The conditional logic may include one or more expressions, ranging from simple to complex, including variables, math operations and functions, that are evaluated using the inputs or outputs of one or more prior operations to determine execution order of subsequent operations. The transaction definition data structure may also provide for broadcast operations and for conditioning the success of their execution. In an illustrated implementation, the transaction definition data structure is an XML (Extensible Markup Language) document in the form of a directed acyclic graph (DAG). A transaction service architecture provides for storing transaction definitions that define specific types or categories of transactions in a transaction database, and for matching a transaction definition to a transaction definition identifier from a requesting application. The transaction service then builds a transaction instance DAG to perform the transaction, produces the messages needed for performing the transaction, and manages the message flow to and from the service applications that perform the constituent operations of the transaction.

10 Claims, 7 Drawing Sheets

OTHER PUBLICATIONS

"RosettaNet Implementation Framework Specification," Version 1.1 published Nov. 8, 1999, available at http://www.rosettanet.org as of Feb. 2000.

Tim Bray, Jean Paoli, and C.M. Sperberg–McQueen, editors, *Extensible Markup Language (XML) 1.0: W3C Recommendation,* World Wide Web Consortium (W3C), Feb. 10, 1998.

David Burdett et al., *Internet Open Trading Protocol—IOTP Version 1.0,* work in progress of the Internet Engineering Task Force (IETP), Oct. 1999, available at IETF web site, http://www.ietf.org, as of Feb. 2000.

Mark S. Merkow, "New technology yields exceptional extranets", Oct. 11, 1999, available from http://www.intranetjournal.com in Jan. 2000.

*Open Buying on the Internet Technical Specifications,* Release V2.0, published by the OBI Consortium; available at the OBI web site, http://openbuy.org, in Feb. 2000.

"Open Buying on the Internet: A Standard for Business–to–Business Internet Commerce", White Paper published by the OBI Consortium; available at the OBI web site, http://www.openbuy.org, in Feb. 2000.

"Microsoft eCommerce & Open Buying on the Internet", Powerpoint presentation published by the OBI Consortium; available at the OBI web site, http://www.openbuy.org, in Feb. 2000.

"XML Architecture", available from MSDN online Web Workshop web site at http://msdn.microsoft.com/xml/general/architecture.asp, download Jan. 29, 2000.

"Netscape Announces Future XML Support in E–Commerce Applications", available at Web Developer News section of InternetNews.com, http://www.internetnews.com/wd–news, Mar. 10, 1999.

"Netscape ECXpert White Paper", available at iPlanet e–commerce solutions web sites, http://www.iplanet.com/products/ecommerce/ecxpert, downloaded Feb. 16, 2000.

"Microsoft working on Net–based OS", San Jose Mercury News, Business section, San Jose CA, Mar. 23, 2000.

Jon Bosak and Tim Bray, "XML and the Second–Generation Web", *Scientific American,* May 1999, available at http://www.sciam.com/1999.

"Sun–Netscape Alliance Announces iPlanet Commerce Integration Suite for Building Online Trading Communities that Leverage Existing Systems Cross–Company", Netscape press release, Aug. 30, 1999, Mountain View CA, available at http://www.netscape.com/newsref/pr.

Box, Kakivaya et al., *SOAP: Simple Object Access Protocol,* work in progress of the Internet Engineering Task Force (IETP), Sep. 1999, available at http://www.ics.uci.edu/pub/ietf, as of Mar. 2000.

"Collaborative Efforts by Industry Leaders Make Business–to–Business Internet Commerce Secure and Interoperable", published by the OBI Consortium; available at the OBI web site, http://www.openbuy.org, downloaded Apr. 26, 2001.

* cited by examiner

TRANSACTION DATA STRUCTURE FOR PROCESS COMMUNICATIONS AMONG NETWORK-DISTRIBUTED APPLICATIONS

CROSS-REFERENCES TO OTHER APPLICATIONS

The subject matter disclosed in this application is related to subject matter disclosed in concurrently filed commonly-assigned U.S. Non-Provisional Patent Application Ser. No. 09/574,334 entitled "Interaction Protocol For Managing Cross Company Processes Among Network-Distributed Applications", now U.S. Pat. No. 9,772,216 B1 , and to U.S. Provisional Patent Application No. 60/205,433 entitled "Shared Transaction Processing in a Clustered Process Automation Environment", now abandoned. These disclosures are incorporated by reference herein for all that each teaches as if set out in full.

FIELD OF THE INVENTION

The present invention relates generally to systems that manage transaction processing message flow in a distributed computer network such as the Internet. In particular, this invention provides a transaction processing system and method that make use of a novel transaction data structure for implementing transaction processing between network-distributed software applications.

BACKGROUND OF THE INVENTION

Business entities have long recognized that substantial productivity and marketing benefits may potentially arise from conducting commercial business activities and business processes over distributed computer networks. In order for a business to achieve the full benefits of network-based commercial activity, the firm's existing commerce-related or business process software application systems must communicate both among each other and with the application systems of other business entities. Earlier efforts at business-to-business commerce activity, such as those led by Electronic Data Interchange (EDI) applications for example, focussed on high volume transaction processing for large firms. Because of incompatible application file formats and communications protocols, and requirements for expensive application programming changes to existing systems, EDI applications were largely viewed as being commercially practical for only the largest companies and for only a select number of applications. Moreover, because of a lack of any universal data interchange formats, companies were, and still are, often prevented from exploiting their own enterprise systems integration to reach external partner applications. As a result a business m ay need to spend substantial time to extract, redefine, and update data to serve specific collaborative needs with partners or customers. In addition, smaller companies with limited information technology development budgets or with old legacy systems may still be struggling with internal business systems integration issues.

In recent years, the Internet distributed computer network has developed the infrastructure and data communications protocols to connect all businesses to each other regardless of their size, geographic location or position in the supply chain. The Internet is a collection of interconnected individual networks operated by government, industry, academia, and private parties that use a set of standard data communications protocols to form a global, distributed network. Networked distributed computer systems may be configured as intranets, extranets or publicly available systems using Internet technologies. Internet technologies provide business entities with another opportunity to achieve substantial productivity gains and marketing benefits by conducting internal, business-to-consumer and business-to-business Internet-based commercial activities among employees, and with customers, vendors, suppliers and other parties related to their business enterprises. Internet-based commercial activities, referred to generally in the current literature as "electronic commerce", "e-commerce", or "e-business" include, but are not limited to, all types of business processes that can take place in a secure manner online, as well as the more traditional buying and selling of goods and services. The Internet environment holds out the promise of true collaborative data exchange and software application interoperability for business firms of all sizes.

Several standardization efforts by industry consortia and e-commerce vendors are underway in an effort to achieve Internet application interoperability and seamless transaction processing that will appear transparent to users. One recent standard, Extensible Markup Language (XML), was adopted by the World Wide Web Consortium in February, 1998. In its broadest sense, XML is a system for defining, validating, and sharing document formats on the Web, providing a universal format for structured documents and data XML is a markup language for presenting documents on the Web that relies on tags and is a meta-language for defining specific subject matter domains of markup tags. XML stores the definitions of tags in files called Document Type Definitions (DTDs). DTDs, also referred to as dictionaries, vocabularies, or schemas, serve as a uniform source of data definitions for specific industries or fields of knowledge, making it easier to exchange data not only within an organization but also among different companies. XML is an extensible standard because users may define their own electronic document type in the form of a DTD. The simple syntax makes an XML document easy to process by machine while the tags promote human understanding of document contents. XML style sheets, called XSL, describe how the tagged data in an XML program should be displayed. Further information about XML and the World Wide Web Consortium, also known as W3C, can be found at the W3C Web site, http://www.w3c.org.

Several efforts underway to standardize transaction processing use XML. In the financial industry, for example, J.P. Morgan & Co. Inc. and Price Waterhouse Coopers recently proposed an XML dictionary called FpML (Financial products Markup Language), which would standardize XML tags in areas such as fixed income derivatives and foreign currency exchange. BizTalk is an industry initiative started by Microsoft Corporation of Redmond Wash. to establish a community of standards users with the goal of driving the rapid, consistent adoption of XML to enable electronic commerce and application integration. The BizTalk design emphasis is to leverage existing applications, data models, solutions, and application infrastructure, and adapt these for electronic commerce through the use of XML. The group is defining the BizTalk Framework™, a set of guidelines for how to publish schemas in XML and how to use XML messages to easily integrate software programs together in order to build new solutions. Additional information about the BizTalk Framework is available at http://www.biztalk.org.

The Internet Open Trading Protocol (IOTP) provides an interoperable framework for Internet commerce that is independent of the particular type of payment system used and is optimized for the case where the buyer and the merchant do not have a prior acquaintance. IOTP describes the content, format and sequences of messages that pass among the participants, referred to as Trading Roles, in an electronic trade. IOTP defines five different types of Trading Roles (Consumer, Merchant, Payment Handler, Delivery Handler, and Merchant Customer Care Provider) that are the ways in which organizations can participate in a trade. The IOTP framework is centered on an IOTP Transaction that involves one or more organizations playing a Trading Role, and a set of Trading Exchanges. Each Trading Exchange involves the exchange of data, between Trading Roles, in the form of a set of IOTP Messages. Each IOTP Message is the outermost wrapper for an XML document that is sent between Trading Roles that take part in a trade. An IOTP message is a well-formed XML document that contains several components including a collection of IOTP Trading Blocks (Request, Exchange, Response) that carries the data required to carry out an IOTP Transaction. An IOTP Trading Exchange consists of the exchange, between two Trading Roles, of a sequence of documents consisting of three main parts; the sending of a Request Block by one Trading Role (the initiator) to another Trading Role (the recipient), the optional exchange of one or more Exchange Blocks between the recipient and the initiator, and the sending of a Response Block to the initiator by the Trading Role that received the Request Block. For more information regarding IOTP, the reader is referred to an Internet-Draft document describing Version 1.0 of the IOTP, published by the Internet Engineering Task Force (IETF) and available at the IETF web site, http://www.ietf.org, as of February, 2000.

The Open Buying on the Internet (OBI, http://www.openbuy.org) standard from the OBI Consortium aims to standardize and secure the corporate purchasing model, especially the high-volume, low-dollar transactions that account for 80% of most organizations' purchasing activities. OBI's goal is to establish a common ground for what is referred to as "The Trading Web," where OBI standards adopters establish trading relationships with other OBI standards adopters through secured access to extranet facilities connected via the Internet, forming dynamic sets of interoperable systems. OBI defines an architectural approach for e-commerce systems, detailed technical specifications, guidelines for development, record layout formats, file formats, communication structures and protocols, compliance testing guidelines, and implementation assistance. The OBI standard includes precise technical specifications for the security, transport, and contents of OBI Order Requests and OBI Orders. In the currently published standard, contents of OBI Order Requests and OBI Orders are based on the ANSI ASC X.12's 850, a standard for an EDI purchase order. The OBI Consortium may provide support for XML documents in the future. For a complete discussion of the OBI technical specifications, consult version 2.0 of the Open Buying on the Internet standard available at www.openbuy.org/obi/specs/obiv2.html.

RosettaNet is an initiative by a consortium of more than thirty companies in the personal computer (PC) industry, ranging from manufacturers to resellers. Two XML data dictionaries in development will provide a common set of properties required for conducting business among Consortium members. The first is a technical properties dictionary (technical specifications for all product categories), and the second is a business properties dictionary which includes catalog properties, partner properties (i.e., attributes used to describe supply chain partner companies) and business transaction properties. The goal is a common business language that will link the entire PC industry's supply chain. These dictionaries, coupled with the RosettaNet Implementation Framework (RNIF, an exchange protocol), form the basis for an e-commerce dialog known as the Partner Interface Process or PIP. RosettaNet's PIPs are specialized system-to-system XML-based dialogs that define how business processes are conducted between electronic component and information technology products manufacturers, software publishers, distributors, resellers and corporate end users. The purpose of each PIP is to enable the development of interoperable applications by providing common business/data models and documents that enable system developers to implement RosettaNet interfaces. Each PIP includes one or more XML documents based on Implementation Framework DTDs, specifying one or more PIP services, transactions, and messages. For further information the reader is referred to the RNIF document designated as version 1.1 and published Nov. 8, 1999, discussing the RNIF in detail, available at More information about RosettaNet is available at the Web site, http://www.rosettanet.org.

Private vendors, such as Ariba Technologies Inc., Commerce One Inc., and Concur Technologies Inc., are using XML to simplify the process of matching up RFPs and purchase orders over the Web. The Ariba Network platform also provides a range of Internet services for buying and selling organizations, including supplier directories, supplier catalog and content management, access to supplier content, and secure transaction routing. The Ariba Network platform is built around a multi-protocol architecture that allows buyers to send transactions from their Ariba buyer-enablement application in one standard format. The Ariba Network platform then automatically converts the order into the suppliers' preferred transaction protocol, eliminating the need for a single standard for electronic commerce and giving suppliers the freedom to transact in their preferred protocol over the Internet. Ariba Network automatically routes and translates transactions between buying organizations and suppliers using many major e-commerce standards, including Internet Electronic Data Interchange (EDI), VAN-based EDI, Open Buying on the Internet (OBI), secure HTML, e-mail, auto-FAX, Catalog Interchange Format (CIF), and a protocol known as Commerce XML (cXML). cXML defines a set of XML DTDs to describe the characteristics of non-production Maintenance, Repair, and Operations (MRO) goods and services. cXML serves as a meta-language to enable the development of "inteigent shopping agents" to assist with the corporate purchasing function. cXML's request/response messaging is used to exchange transaction data between parties. These messages provide support for purchase orders, charge orders, acknowledgements, status updating, shipment notifications, and payment transactions.

The public and proprietary efforts underway to standardize transaction processing in the distributed network environment are largely directed to specific industry, function or subject matter domains, such as PC supply-chain management, financial payment handling, or corporate purchasing. Thus, it appears that the standardization effort is directed to establishing predetermined descriptions of transaction message exchanges or dialogs that are specific to and optimized for a specific subject matter or industry domain. Automated commerce solutions that define interactions in terms of fixed message exchanges forgo the flexibility and adaptability required in today's dynamic marketplaces. There will be a wide range of interactions between any two parties in the marketplace that simply do not lend themselves to easy categorization or definition, and that will change over time as the business needs change and as their relationship changes.

XML and related data representation standardization efforts, combined with industry-based e-commerce standards efforts, clearly expand the reach of Internet-based e-business to a wider range of enterprises and are efforts in the direction of an integrated Internet e-commerce environment. But these efforts alone fall short of the complete integration needed. What is needed is a transaction processing architecture that directly supports users' needs in the marketplace and a uniform, consistent and flexible transaction definition capability that supports a full range of transaction processing in a distributed network environment.

SUMMARY OF THE INVENTION

The present invention is premised on the observation that a distributed network marketplace must be able to provide both services and support processes to the parties (users) who participate in the marketplace. For example, a distributor who sells items from a catalog benefits from an easy-to use catalog update service from its suppliers, and a manufacturer benefits from the ability to request a bid with precise terms and to receive only those responses that meet the specified terms. Automated commerce solutions should allow for flexible a nd adaptable definition of these types of interactions to promote and facilitate dynamic marketplaces. Thus, the present invention is premised on the further observation that a comprehensive e-commerce solution must provide a framework, or architecture, that allows for the definitions of the most complex interactions between parties to be both easily configured and easily changed by the parties as their business needs change. Such a solution should also be platform independent to support a wide variety of computing environments.

The present invention provides a transaction processing architecture for a process automation application, referred to as a commerce exchange server. The transaction processing architecture is premised on a user-centric view in which a transaction is a single unit of work from the perspective of the requesting application, or client. The trans action may require several processing components to achieve its end result. However, once the user defines those components and their process flow using a unique and novel transaction definition data structure, the commerce exchange server produces the messages needed to perform the transaction and manages the message flow to and from the service applications without further intervention from the user. Thus, the commerce exchange server is much more than a mere conduit for the message exchange between client and service applications.

In this transaction processing model, every transaction has one and only one input document sent from a requesting client application and one and only one output transaction response document sent back to the client. However, each input and output document may have multiple components, or sub-documents. This design precept provides distinct and significant advantages over other transaction processing solutions. First, it considerably simplifies the design of the commerce exchange server by limiting the message exchange between requesting and service applications. Developing client applications becomes straightforward when the client merely issues a transaction request and gets a single response back with the output it requested. In addition, the commerce exchange server takes the complexities of managing a complete transaction away from the requesting client, moving the low-level transaction processing logic common to all transactions to a single source.

Finally, this transaction processing model supports the three most common types of application interaction models in the e-commerce environment. These models are generally known as request/reply, publish/subscribe and broadcast. In an illustrated implementation of the commerce exchange server, the request/reply interaction model allows two parties to exchange information in an asynchronous, or non-blocking, fashion. In asynchronous messaging, the requesting application sends a transaction request to the commerce exchange server and may continue its own processing, without waiting for the transaction to be processed. An acknowledgement response is sent that contains tracking information that allows the requesting party to query the status of the transaction request. In a publish/subscribe interaction model, two applications interact via an intermediary party. The applications that are interested in specific information register with the intermediary party. The information generating application posts, or publishes, the information to the intermediary, which in turn passes this to the registered parties. In this model, the information requester and the information supplier never interact directly. The broadcast model is a special case of a model known as the multicast model, both of which send a message to the members of a group of parties who support the requested operation. When the group size is less than the entire membership of a domain, a message is broadcast to the group; when the group size equals the entire membership, sending the message to the entire group is referred to as multicasting. The message sent in this type of interaction model is typically one of two types: a request message, resulting in a reply message returned, or a notify message that simply reports information or events. Note also that in the multicast interaction model, the recipient group may or may not be subscription based. The information receiver application determines this from the content of the broadcast message. The transaction model of the present invention provides support for all three interaction models.

The transaction processing architecture is further premised on the discovery of a novel transaction definition data structure. This data structure allows the user to define a transaction composed of component operations and to define the order of those operations, including determining whether an operation is a broadcast operation or whether more than one operation should be performed concurrently before proceeding to a next operation. The data structure also allows the user to specify the source of input data needed to perform each operation and to place conditional logic on the execution of an operation, based on results of one or more previously executed operations. The transaction definition data structure allows a transaction to be specifically customized to the business needs of the user who defines the transaction.

In an illustrated embodiment of the present invention, the transaction definition data structure is an XML document that includes multiple OPERATION sections for specifying the component operations that make up the transaction. An input section, referred to as a JOIN section, within an OPERATION section of the XML document includes markup tags for specifying the source of input data needed A conditional logic section, referred to as a SPLIT section, within an OPERATION section of the XML document includes markup tags for specifying whether a subsequent operation in the operation flow should be conditioned on the output of a previous operation.

The transaction processing architecture supports this flexible and adaptable transaction definition model. The user provides a unique transaction identifier for each transaction definition, stores them in a database of definitions, and then simply requests that a transaction be performed by its transaction identifier. The transaction processing architecture of the present invention defines a transaction service that performs several essential functions. The transaction service obtains the appropriate definition, builds an internal transaction processing data structure and performs the transaction. In an illustrated implementation of the transaction service, all transaction definitions stored in the database are loaded at start-up of the commerce exchange server, and the transaction service obtains the appropriate definition from memory. In an alternate implementation the transaction service may retrieve the appropriate definition directly from the database. In the illustrated embodiment described herein, the internal transaction processing data structure, referred to as a transaction instance, is a directed acyclic graph (DAG) with the conditionals and mapping functions and logic to represent the definition of the transaction. The transaction service then creates and maps the XML documents with input and output variables in order to create and send the various messages needed for transaction execution. The transactions service evaluates the conditional logic and traverses through the DAG in order to execute the transaction, and produces and sends an output response to the requesting application.

The commerce exchange server, including the transaction processing architecture that makes use of the novel transaction definition data structure, may be implemented in any type of distributed network of processor-controlled machines such as, for example, in the Internet environment. Protocols for implementing message exchanges in the Internet environment are disclosed in the Protocol patent application referenced above.

Therefore, in accordance with one aspect of the present invention, there is provided an XML (extensible markup language) transaction definition document stored on a computer-readable medium comprising a plurality of operation data portions each defining an operation. The plurality of operations collectively define a transaction. Each operation data portion, when parsed by a process automation application, causes the process automation application to communicate with a service application program to perform the operation. At least one operation data portion comprises a conditional logic data portion that, when parsed by the process automation application, causes the process automation application to condition performance of a next operation on evaluation of operation response data from performing the operation.

In another aspect of the invention, at least one operation data portion included in the XML transaction definition document indicates a broadcast operation and includes a broadcast data portion. When parsed by the process automation application, the broadcast data portion causes the process automation application to communicate with a plurality of service applications to cause each service application to perform the operation. In a further aspect of the invention, the broadcast data portion further includes an expression data portion indicating at least one of a mathematical expression, a function, and a variable data item. When parsed by the process automation application, the expression data portion causes the process automation application to evaluate the at least one of the mathematical expression, the function, and the variable data item using the operation response data to determine the success or failure outcome of the broadcast operation.

In another aspect of the present invention, there is provided a transaction definition data structure stored on a computer-readable medium comprising a plurality of operation data portions indicating a plurality of operations collectively defining a transaction. Each operation data portion defines an operation. Each operation data portion comprises an operation identifier uniquely identifying the operation among the plurality of operations, a service application name indicating a service application for performing the operation, an input data portion indicating input data used by the service operation for performing the operation, and a conditional logic data portion indicating evaluation data conditioning performance of the next operation on evaluation of operation response data received from the service application performing the operation.

In another aspect of the present invention, there is provided a computer-implemented method for performing a transaction comprising the steps of producing a transaction instance data structure indicating a plurality of operations constituting a transaction. The transaction instance data structure indicates a linking of the plurality of operations to indicate an operation performance order. The transaction instance data structure further indicates conditioning logic data for changing the operation performance order such that the plurality of operations is capable of being performed in more than one possible order. The computer-implemented method for performing a transaction further includes, for each of the plurality of operations, producing an operation request message indicating input data for performing an operation, sending the operation request message to a service application to perform the operation using the input data, receiving an operation response message from the service application indicating output data from the operation, and determining a next operation to perform using the conditioning logic data and the output data of the operation response message.

In yet another aspect of the present invention, there is provided a distributed transaction processing system comprising a plurality of service application programs each capable of performing an operation, and a data store including a plurality of transaction definitions. Each transaction definition indicates a transaction definition name uniquely identifying the transaction definition and a plurality of operation definitions indicating a plurality of operations constituting a transaction. The distributed transaction processing system further comprises a requesting application program that produces a transaction request message indicating a transaction definition name identifying one of the plurality of transaction definitions included in the data store, and a computer having a memory device for storing a process automation application. The process automation application receives the transaction request message indicating the transaction definition name from the receiving application program and uses the transaction definition name to obtain the transaction definition from the data store. The process automation application produces an operation request message for each operation definition included in the plurality of operation definitions and sends the operation request messages to at least one service application program. The at least one service application program sends an operation response message to the process automation application in response to receiving an operation request message. The process automation application produces a transaction response message using the operation response messages, and sends the transaction response message to the requesting application.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps.

DETAILED DESCRIPTION OF THE INVENTION

1. A Commerce Server Architecture Utilizing the Transaction Data Structure.

a. Process Components.

Figure 1:
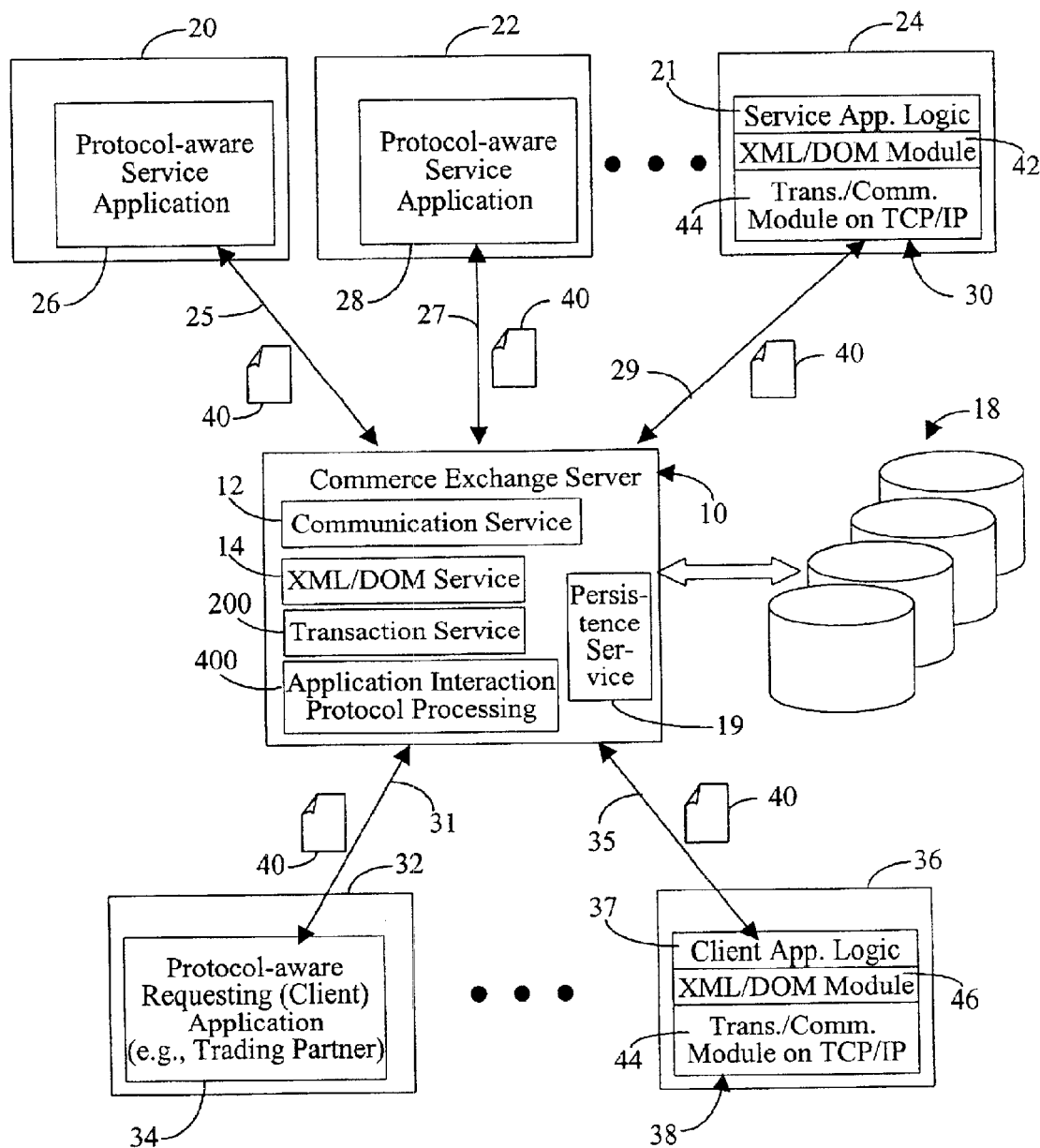
FIG. 1 is a block diagram schematically illustrating a systems architecture for managing transaction message flow in a distributed computer network according to the present invention.

FIG. 1 illustrates a system architecture for enabling application-to-application interaction in a distributed computer network. Specifically, the system architecture of FIG. 1 illustrates an inter- or intra-enterprise Internet-based electronic commerce architecture including process automation application 10, referred to as a commerce exchange (CX) server. CX server 10 operates as a type of clearinghouse, receiving operation requests posted by client components 34 and 38 and directing them to appropriate service components 26, 28 and 30 (via communication connections 25, 27, and 29, respectively) identified ("signed up") to CX server 10 as being available to perform those services. In this capacity, much of the processing performed by CX server 10 involves searching for service component by service operation and searching for client components by their identification numbers. CX server 10 also performs a variety of administrative functions including transaction tracking and audit functions and disaster recovery functions.

Each application component is referred to as a commerce exchange component, or CXC. As shown in FIG. 1, there may be any number of CXCs identified to CX server 10. A CXC application either provides one or more services or originates a transaction request, or both. A CXC application may be integrated with CX server 10 as a built-in component residing on the same machine or it may be a third party application resident on a different machine. For example, service application 30 is resident on machine 24 and accessible to CX server 10 via communications connection 29, and requesting application 38 is resident on machine 36 and accessible to CX server 10 via communications connection 35. The type of architecture model illustrated in FIG. 1 may be variously described in the literature as an information bus model, a client-server model or a cooperative agent model.

i. Communication Service.

CX server 10 includes several processing services: Communication service 12; XML/DOM service 14; Transaction service 200; and Persistence service 19. Communication service 12 provides interfaces for accepting and establishing connections, and sending and receiving messages through various network transport protocols. In an illustrated implementation of CX server 10, the network transport protocol supported is TCP/IP, but other transport protocols may be supported as well. Communication service 12 also provides a variety of other communications-related services including notification of broken connections, fragmentation and assembly of messages, and connection-level session management and handshaking functions.

ii. Application Interaction Protocol Processing.

CX server 10 also includes an application interaction protocol processing function 400. CX server 10 is a document-centric process automation application, exchanging messages in the form of XML documents 40 between CXCs. These XML documents form the underlying message exchange protocol, referred to as the Commerce Exchange Interaction Protocol, hereafter CXIP. Standardizing the messaging format in this manner allows for the straightforward integration of third party applications as CXCs, without the absolute requirement for application-specific libraries. Each CXC includes two software interface components (not shown) for extracting transaction data from XML-based message 40. A transportation/communication module handles the syntax and semantics of the Application interaction message received from CX server 10 over the particular communications transport mechanism (e.g., TCP/IP), receiving a message and returning an XML document. Then, an XML/DOM (Document Object Model) module receives the XML document output produced from the transportation/communication module, parses the document and returns one or more DOM objects that are passed to the application logic for handling as standard program objects. The use of DOM objects is discussed in more detail below. A CXIP message is in the data representation format specified by XML, which is presumed to be an 8-bit character format in the present implementation. Sending and receiving applications have the responsibility of encoding and decoding data embedded inside a CXIP message.

The present implementation of CXIP supports eight (8) message types that implement the three most common application interaction models (Request/Reply, Publish/Subscribe and Broadcast) in the Internet environment. These eight message types are Request, Reply, Cancel, Publish, Notify, Subscribe, Unsubscribe, and Acknowledge. An Acknowledge message is a special type of message used to acknowledge receipt of all of the other message types. An Acknowledge message may contain any information needed for tracking purposes, such as for querying the status of a prior request, or purposes of establishing an audit trail or transaction log. An application should follow the application interaction protocol by sending an Acknowledge message for each received message, except for the Acknowledge message itself Application interaction models may be implemented in either synchronous or asynchronous mode. An illustrated implementation of CX server 10 operates in asynchronous mode, also referred to as the offline, or non-blocking, model. The Protocol patent application provides additional details about an illustrated implementation of the application interaction protocol.

The basic transport assumption in the application interaction protocol, CXIP, used by CX server 10 is the guaranteed delivery of messages. As long as this requirement is satisfied, the underlying transport protocol may be any standard communications protocol. As noted above, the present implementation of CXIP is based on TCP/IP. In this implementation, CXIP messages are transmitted as TCP data between applications. A field size data item in the fixed-length message header of a CXIP message indicates the length of the associated message content in byte counts so that the receiver may easily determine the end of a message without having to test for a special message-termination character. CXIP may also be implemented on top of other transport mechanisms such as SMTP and FTP. Cooperating applications (CXCs) based on different transportation mechanisms (e.g., SMTP or FTP) are implemented by including a bridging mechanism in Communication service 12 (not shown) for translating messages between TCP/IP and SMTP and FTP message formats. To enable HTTP-based interactions a MIME type may be defined, such as "application/x-cxip-v10", and it is straightforward to develop a browser plug-in to handle CXIP messages.

iii. Transaction Service.

Transaction service 200 provides interfaces for working with transaction logic, tracking a transaction thread, traversing transaction logic and performing transaction execution. CX server 10 provides a virtual workspace, or transaction execution space, to participating (registered) CXC applications. A CXC submits a transaction request based on a published CX transaction document type declaration (DTD). Upon receipt of a transaction, CX server 10 identifies the set of operations that comprise the transaction based on a transaction definition in data store 18, and then executes the transaction by providing operation requests to CXCs identified as registered to perform the respective operations. Each invoked CXC performs the specified operation request(s) and sends back results to CX server 10, which, after completion of all operation requests, returns the transaction response back to the originating CXC. A transaction definition takes the form of a directed acyclic graph. CX server 10, with knowledge of the transaction logic from the transaction definition, controls all processing decisions including which operations to perform, to which CXC to forward an operation request, how to process the conditions on the services, which information to pass and receive, and when to terminate processing.

iv. XML/DOM Service.

XML/DOM service 14 provides interfaces and services for handling the XML documents 40 that form the basis of the message exchange protocol. Services include parsing and constructing XML documents, and building and accessing DOM (Document Object Module) object trees. The Document Object Model (DOM) is a platform- and language-neutral application programming interface (API) for HTML and XML documents that models these documents using objects. The DOM provides a standard set of objects for representing HTML and XML documents, a standard model of how these objects can be combined, and a standard interface for accessing and manipulating them. As an object model, the DOM identifies the semantics of these interfaces and objects, including both behavior and attributes, and the relationships and collaborations among these interfaces and objects. Because of its platform- and language-independent format, the DOM is used as an interface to proprietary data structures and APIs, instead of product-specific APIs, in order to achieve application interoperability with less effort. Additional information regarding the DOM may be found at http://www.w3.org/DOM/.

XML/DOM service 14 may make use of any public domain XML parser. Although the XML-based document messaging format is primarily used for exchanging active messages, some internal data used by CX server 10 are also represented and stored as XML documents. For example, the transaction directed acyclic graph that defines the component services of a transaction is an XML document. Therefore, other service components, such as transaction service 200, may use XML/DOM service 14 for translation between XML syntax and an internal data format requirement.

v. Persistence Service.

Persistence service 19 provides interfaces for storing information into and retrieving information from external data stores 18. From the perspective of CX server 10 or a CXC, data entering into or coming from data stores 18 are in XML document format. Persistence service 19 has the responsibility of mapping between an XML document and the respective data store schema. In an illustrated implementation of CX server 10, data stores 18 include a Netscape™ message server, a Netscape™ LDAP server, and an Oracle™ database server. Support for flat files is also possible. Examples of information that are included in data stores 18 are system parameters, events and alerts, and transaction definitions.

b. Process and Threading Models.

CX server 10 executes as a single process that listens to one listener port and one administrative port for application protocol (CXIP) messages. The single process model distinguishes CX server 10 from conventional application servers that follow the traditional multi-process model. The single process model is critical to the implementation of conditional-logic transaction processing and the complexities of event notification and process control over the CXCs. Moreover, the single process model simplifies administration of the CX server 10 by the system administrator, and is more efficient in database access than a multi-process model. In addition, a single multi-threaded process is typically more efficient than multiple single or multi-threaded processes because it uses fewer system resources such as memory and disk space, assuming that each thread is scheduled as having the same priority as the kernel thread. The capability of deploying a backup CX server addresses the problem of a single point of failure caused by using a single process model.

CX server 10 supports both a single-thread and multi-thread model. A single-threaded CX server listens to both the administrative and listener ports at the same time and processes incoming request one after another, in serial fashion. Priority processing is not supported and event processing support is restricted. The single-thread model does not allow for the CX server to load CXC libraries. The multi-threaded CX server uses multiple threads for listening and accepting connections from the administrative port, listening and accepting connections from the listener port, listening and receiving messages from established connections, priority processing of transactions (messages), and executing CXC libraries loaded as part of the process. The multi-threaded model supports both serial and non-serial processing of requests. Serial and non-serial processing are distinguished by whether the message listening thread waits for termination of the thread that is created to process the message. Threading and serialization are determined by configuration parameters provided at startup.

In one embodiment of CX server 10, a commerce exchange component (CXC) is expected to establish a persistent connection, throughout the lifetime of the CXC, to the CX server and to use the connection for all message exchanges. The CX server uses the connection to determine the existence of the CXC in the network. Each message received through a persistent connection is processed concurrently using an independent thread. This implementation improves message-processing performance, minimizes the usage of system resources, and eliminates the overhead of establishing and terminating a connection for each new request.

In the illustrated implementation of CX server 10 herein, CX server 10 supports asynchronous transaction processing. That is, when an operation request is sent from CX server 10 to a CXC, the processing thread does not block for a response from the CXC and instead sets the state of the transaction and exits from the thread. When a response message is received, the transaction is executed based on the state and the type of response. Support for asynchronous transaction processing achieves efficiency from the single shared connection between CX server 10 and a CXC. Requests may be sent from the CX server simultaneously in multiple threads and the responses may be returned in any order according to how the CXC process them, without waiting for the requests to be performed serially. In addition, timer events may be introduced more easily, thus creating an event-driven processing model.

c. Distributed Transaction Processing Support.

FIG. 1 also illustrates a representative configuration of the application architecture required to implement transaction processing in a distributed computer network such as the Internet. This application architecture makes use of the Document Object Model (DOM) described above. Service application 30 and requesting (client) application 38 each includes transportation/communication module 44 for handling the syntax and semantics of application interaction message 40 received from CX server 10 over a TCP/IP transport mechanism. Transportation/communication module 44 receives message 40 as TCP/IP data and returns an XML document. In service application 30, XML/DOM module 42 receives the XML document output produced from transportation/communication module 44, parses the document and returns one or more DOM objects that are passed to service application logic 21 for handling as standard program objects. Similarly, in requesting application 38, transportation/communication module 44 receives message 40 as TCP/IP data via communications path 35 and returns an XML document. XML/DOM module 46 then receives the XML document output produced from transportation/communication module 44, parses the document and returns one or more DOM objects that are passed to application logic 37 for handling as S standard program objects. This component module application architecture enables any third party application to be straightforwardly integrated as a commerce exchange component (CXC) in the domain of a commerce exchange server. Development of these component modules is technically straightforward in either Java or C++ implementations.

CX server 10 also supports distributed transaction processing. A CX server in one enterprise or network may communicate with a CX server in another enterprise or network to cooperatively fulfil transaction requests. Thus, one CX server 10 that cannot fulfil a service component of a transaction request using a participating CXC in its own domain may send the operation request to another CX server (not shown in FIG. 1) that includes a participating CXC that has the capability to perform the service. This feature enables an enterprise or group of enterprises to deploy cooperating commerce exchange applications. Note also that, while FIG. 1 shows TCP/IP as the message transport protocol, transportation module 44 may be implemented on top of SMTP or FTP as well. Cooperating applications (CXCs) based on different transportation mechanisms may also be implemented by developing a bridge that translates messages from one protocol to another.

2. Transaction Message Types and Message Flow.

Preliminary to describing transaction processing and its associated data structures, definitions are provided for some terminology that has specific meanings in the context of the present invention. These terms have the meanings given here throughout this disclosure, rather than any meanings that may occur in other sources, such as, for example, in documents, if any, that are incorporated by reference herein elsewhere in this description.

The term data or data item refers herein to physical signals that indicate or include information. Data includes data existing is any physical form, and includes data this is transitory or is being stored or transmitted. For example, data could exist as an electromagnetic or other transmitted signal or as a signal stored in electronic, magnetic or other form. A data structure as used herein is any combination of interrelated data items. For example, an XML document is a data structure. A data item indicates a thing, an event or a characteristic when the item has a value that depends on the existence or occurrence or the measure of the thing, event or characteristic. A first item of data indicates a second item of data when the second item of data can be obtained from the first item of data, when the second item of data can be accessible using the first item of data, when the second item of data can be obtained by decoding the first item of data, or when the first item of data can be an identifier of the second item of data.

An operation is a single, atomic process that acts upon input data to achieve a unit level function. An operation may sometimes be referred to as a service. The CX server handles an operation as a single unitary process, while the scope and nature of the processing involved in an operation is defined by the service application that performs the operation. A transaction is a set of one or more operations that are to be performed in a defined order under given conditions by one or more participating service applications.

A transaction definition is a data structure that defines a type or category of valid transaction to CX server 10. A transaction definition includes the component operations that constitute the transaction, the identity of the input data items required to perform each operation and the source of values for that data. A transaction definition also includes process flow information that indicates conditional logic, if any, to be applied to a component operation, and the data items and format of the output results of the transaction.

Note that a transaction definition may include only one transaction. A transaction database is a collection of one or more transaction definitions. Each transaction definition includes a unique identifier within a given domain referred to herein as a transaction definition name.

Every transaction definition conforms to a transaction directed acyclic graph data structure, or transaction DAG. That is, the transaction DAG specifies the ordered set of data items that are both required and optional for a transaction definition. A directed acyclic graph is known in the art as a set of nodes and a set of ordered pointers between the nodes that define at least one path through the graph, subject to the constraint that no path starts and ends with the same node.

A transaction instance data structure, or transaction instance, is a specific implementation of a transaction definition that indicates the specific data to be used to perform the transaction defined by the transaction definition. Thus, a transaction definition may be viewed as providing a template for producing a transaction instance when provided with specific input data on which to operate. A transaction instance has a unique identifier within a given domain, referred to as a transaction ID, associated with it.

In the illustrated implementation of the transaction service described below, a transaction definition is specified using Extensible Markup Language, or XML, and so is a data object called an XML document. XML describes a class of data objects called XML documents and partially describes the behavior of computer programs that process them. XML is an application profile or restricted form of SGML, the Standard Generalized Markup Language [ISO 8879]. By construction, XML documents are conforming SGML documents. Each XML document has both a logical and a physical structure. Physically, the document is composed of units called entities. An entity may refer to other entities to cause their inclusion in the document. A document begins in a "root" or document entity. Logically, the document is composed of declarations, elements, comments, character references, and processing instructions, all of which are indicated in the document by explicit markup declarations. The logical and physical structures must nest properly, as described in "4.3.2 Well-Formed Parsed Entities" in the World Wide Web Consortium XML specification. A software module called an XML processor is used to read XML documents and provide access to their content and structure. It is assumed that an XML processor is doing its work on behalf of another processing entity or module.

An XML document type declaration contains or points to markup declarations that provide a grammar for a class of documents. This grammar is known as a document type definition, or DTD. The document type declaration can point to an external subset containing markup declarations, or can contain the markup declarations directly in an internal subset, or can do both. The DTD for a document consists of both subsets taken together. An XML document is valid if it has an associated DTD and if the document complies with the constraints expressed in its associated DTD. An XML document is a well-formed AML document if the document, taken as a whole, matches the XML production labeled "document," meets all the constraints with respect to being well-formed given in the XML specification, and each of the parsed entities referenced directly or indirectly within the document is well-formed. A well-formed XML document may also be valid if it meets additional criteria, as specified in World Wide Web Consortium, Extensible Markup Language (XML) 1.0: W3C Recommendation 10 Feb. 1998.) Additional information about XML is available at http://www.w3.org/XML and www.w3.org/TR/PR-xml-971208.

Figure 2:
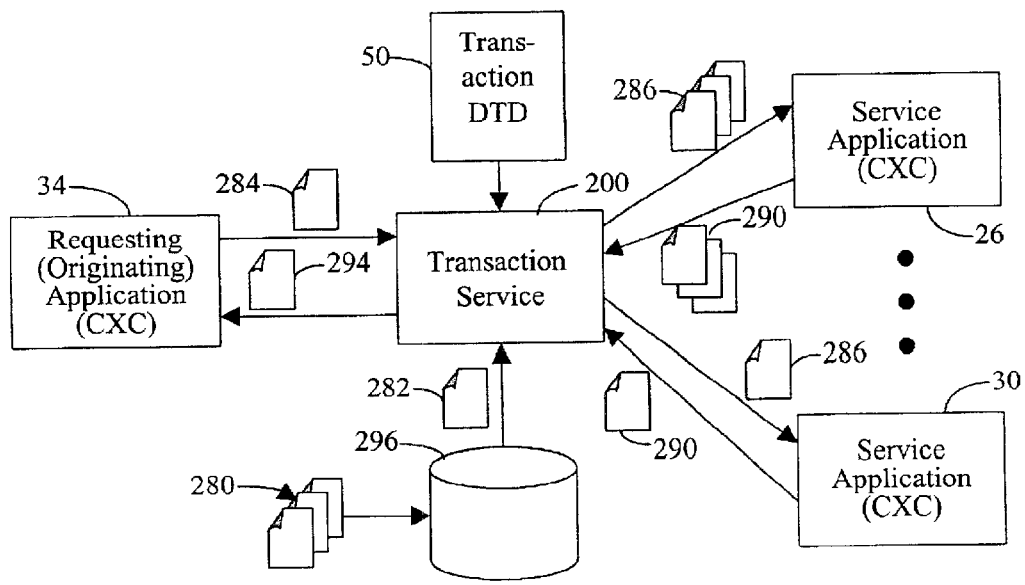
FIG. 2 is a block diagram showing the types of messages and the general message flow of a transaction between the transaction service component and the service and requesting applications of FIG. 1.

FIG. 2 illustrates the components of an illustrated embodiment of the transaction service architecture and the message types associated with a transaction instance. Transaction service 200 is responsible for producing some of the messages involved in performing a transaction, and for managing the message flow necessary to perform a transaction. FIG. 2 shows the transaction message flow and assumes that messages are received by CX server 10 and, after processing by other components (e.g., communications service 12 and application interaction protocol processing service 400), are passed to transaction service 200. There are four types of messages managed by transaction service 200. These are a transaction request message, an operation request message, an operation response message, and a transaction response message. Note that in the illustrated embodiment of CX server 10 described herein, each of the four types of messages is an XML document that conforms to the application interaction protocol handled by application interaction protocol processing service 400 (FIG. 1) and described in the Protocol patent application.

A requesting (or originating) application 34 submits a transaction request 284 to transaction service 200. Transaction request 284 is a data structure that indicates a request to process a transaction according to the transaction definition identified by a transaction definition name included in transaction request 284. A transaction is single unit of work from the perspective of the requesting application, or client. In the transaction processing model of CX server 10, every transaction has one and only one input document and one and only one output document, although each input and output document may have multiple sub-document components. Transaction service 200 receives request 284 and uses the transaction definition name to obtain the appropriate transaction definition 282. In the illustrated implementation of transaction service 200, all transaction definitions 280 included in transaction database 296 are loaded into memory at the start-up of CX server 10. However, transaction service 200 could also retrieve the appropriate transaction definition 282 from among all transaction definitions 280 included in transaction database 296.

Figure 3:
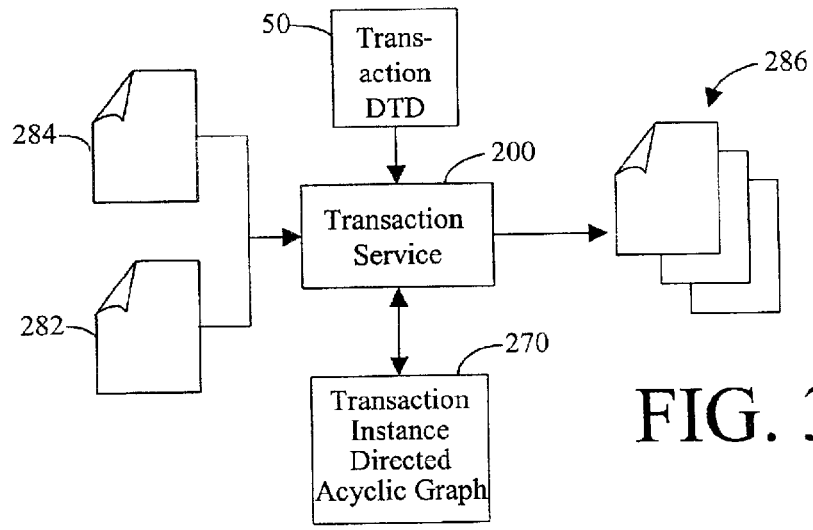
FIG. 3 schematically illustrates the inputs to the transaction service function of producing an operation request document according to an illustrated embodiment of the invention.

Transaction service 200 uses transaction DTD 50, transaction definition 282 and transaction request 284 to produce a transaction instance data structure 270 (FIG. 3). The transaction instance is an internal data structure that transaction service 200 uses to perform the requested transaction. In an illustrated embodiment of transaction service 200, the transaction instance data structure is a directed acyclic graph. For every operation included in the transaction instance, transaction service 200 produces an operation request document 286. Operation request document 286 is sent to a service application 26 (a CXC) to perform the operation. FIG. 3 schematically shows the production of operation request document 286 using transaction definition 282, transaction request 284, transaction instance 270 and transaction DTD 50. Transaction service 200 uses transaction definition 282 and transaction request 284 to produce transaction instance 270, which includes information about each operation in the transaction. Each operation is uniquely identified within transaction instance 270 and includes the name of the service application that is to perform that operation. Transaction service 200 obtains the input data needed for execution of the named operation from transaction request 284 and provides it in operation request document 286 according to specifications provided in transaction instance 270. Additional information about the content of the operation request document and how it is produced is discussed below.

Returning again to FIG. 2, transaction service 200 may send several operation request documents 286 to a single service application 26, and may send operation request documents 286 from a single executable transaction to several service applications 26 and 30. When a service application 26 completes an operation, it produces an operation response document 290 indicating the results of the operation and sends operation response document 290 to transaction service 200. Operations within a transaction instance are performed according to an order specified in transaction definition 282. Thus, transaction service 200 tracks the receipt of operation response documents both to determine what operation(s) to perform next and to determine when a transaction instance is complete. Transaction service 200 may use operation results included in an operation response document 290 to produce a subsequent operation request document 286 for a subsequent operation to be executed.

Figure 4:
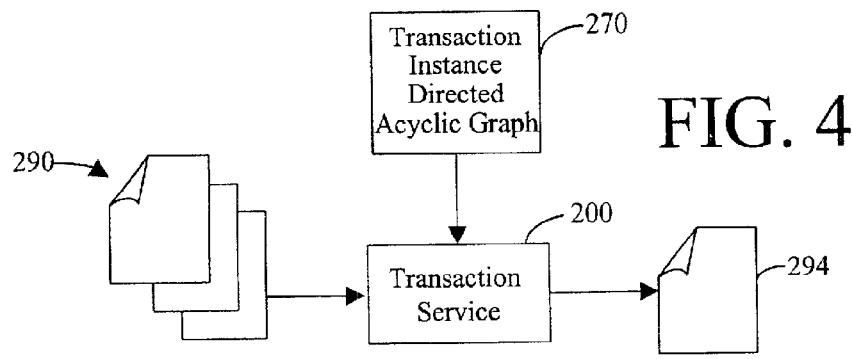
FIG. 4 schematically illustrates the inputs to the transaction service function of producing an operation response document according to an illustrated embodiment of the invention.

When all operations of a transaction instance have been completed, transaction service 200 produces a transaction response document 294, as shown schematically in FIG. 4, using operation response documents 290, and transaction instance 270. Transaction service 200 obtains from transaction instance 270 the format in which the originating requesting application expects to receive the output results of a completed transaction, and prepares transaction response document 294 using the results provided in operation response documents 290. Then, as shown in FIG. 2, transaction service 200 returns transaction response document 294 to requesting (originating) application 34.

3. Description of the Transaction DAG Data Structure.

a. Functional Components of a Transaction.

Figure 5:
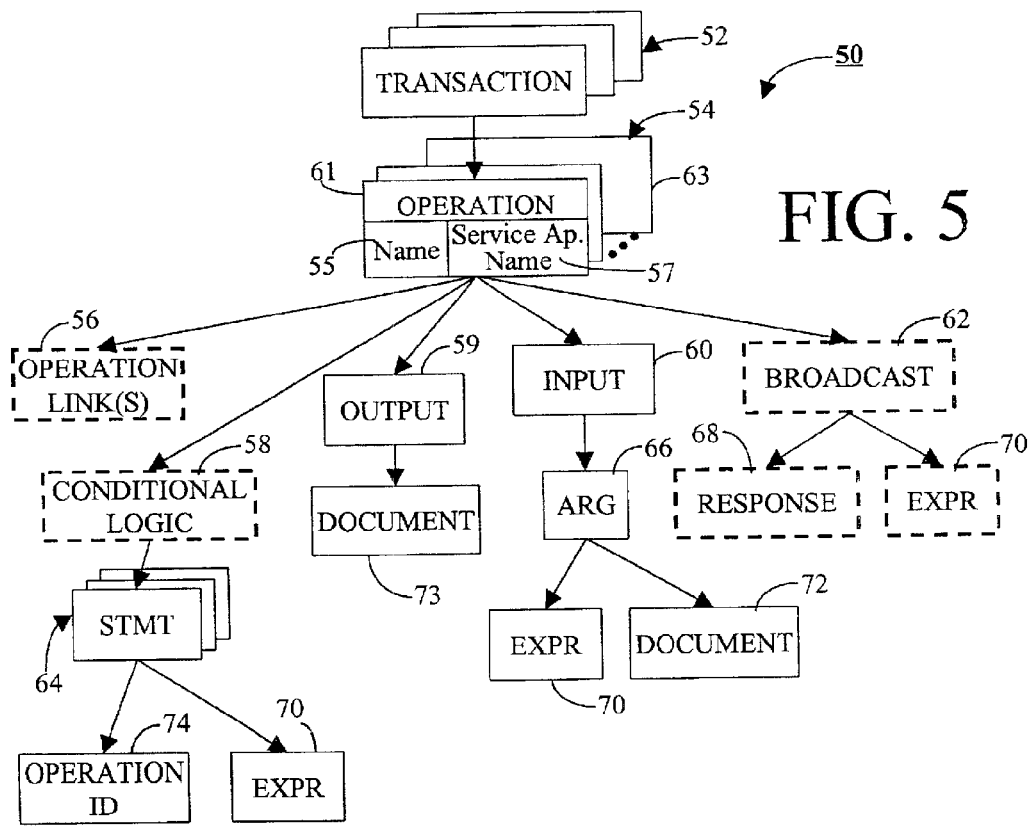
FIG. 5 is a block diagram schematically illustrating the major entities of the transaction data structure and their organization.

Transaction definition 282 of FIG. 2 serves as a template for a specific transaction instance and is an XML document having the logical and physical structure specified by its associated transaction DTD 50. The general organization and major functional entities of the transaction directed acyclic graph data structure 50 are schematically illustrated in FIG. 5, with each functional entity shown as a named rectangular box. The identifying data entity names used in FIG. 5 are not intended to limit the data structure in any way. The data entities are illustrated in a hierarchy to show each entity's constituent parts. An entity that may have more than one occurrence is illustrated by multiple offset boxes. Each occurrence includes all of the entities at lower levels in the hierarchy. Entities that are composed of the same data items are labeled with the same reference numbers. An entity that is required is shown with its box in solid outline while the box of an optional entity is shown with a dark dashed outline. A required entity indicates that either the data is explicitly included in the data structure or the necessary data is obtained from some other source by default. The entities that exist below an optional entity in the hierarchy are shown as being either required or optional for the case when the optional higher level entity is present in the transaction. Because an XML DTD expresses both a logical and a physical structure, some of the data entities have logical processing associated with them. The entities and their processing behaviors are defined as follows. Note that the interpretation of DTD 50 described below are defined by a specific implementation of transaction service 200, and are not associated with the DAG data structure. For example, the default behaviors that are described below when no value is provided for a tag or when an optional section is missing indicate the specific interpretation of the illustrated embodiment described herein. The interpretation of DTD 50 described below thus reflect an illustrated embodiment of transaction service 200, and other interpretations are also possible.

A transaction instance 52 is composed of a set of ordered operations 54. In the directed acyclic graph, an operation is represented by a node in the graph. Every transaction has two specific nodes, or operations, called the head operation and the tail operation. Operations 61 and 63 are shown as the head and tail operations respectively. Operation flow within a transaction always proceeds from the head operation to the tail operation. There may be one or more operations between the head and tail operations but each operation is performed only once. Note that if the operation is a broadcast operation, it is still considered to be performed only once, even though the operation may be sent to many service applications to be performed. There may be more than one possible path through the graph from the head operation to the tail operation, and one of those possible paths is executed at runtime. Thus, the path through the graph for a given transaction definition will not necessarily be the same for each transaction instance of that transaction definition because of differing run time conditions.

Each operation is defined to include five functional entities: name 55, Service application name 57, INPUT 60, CONDITIONAL LOGIC 58 and OPERATION LINK(S) 56. These entities provide the information used to produce the operation request document 286 used by a service application to perform this operation and to provide conditional logic to determine which operation(s) is to be performed after the completion of this operation. A unique operation name 55 represents the operation within the context of its transaction. A service application, or CXC, name 57 specifies the service application that can perform this operation. Note that the name of the operation can be determined at run-time by looking up a CXC which has signed up to perform that operation.

The INPUT entity, which is the only required entity, provides information sufficient to prepare the operation's operation request document 286 (FIG. 2 and FIG. 3). A list of expressions 60, referred to as INPUT entity logic, is used to build the input arguments for the operation request message 286 for the operation to which this INPUT entity belongs. If the processing for the INPUT entity fails, the operation will not be executed. If no INPUT entity is provided, a default INPUT consolidates all of the preceding operations' operation response documents 290 into the operation request document 284 for this operation. The ARGUMENT component 66 provides an argument to add to the operation request document 286 for this operation. It specifies the name and type of the argument along with a tag indicating if it is required or optional. The associated EXPRRESSION component 70 defines how to derive the value for this argument. An argument may derive its input data from another document, or generate a value based on some EXPRESSION. DOCUMENT component 72 identifies an XML document and defines how that document should be mapped to the indicated argument (ARG). It defines the operation that contains the document and the relevant section(s) of the document to extract. Transaction DAG structure 50 also includes runtime data in the form of OUTPUT entity 59 which includes DOCUMENT entity 73, for use in assembling the output response document.

An important feature of DAG structure 50, and the reason that there may be more than one possible path through a transaction instance graph, is that the execution of one or more of OPERATIONS 54 (except for operations 61 and 63) may be conditioned on the output of previous operations. The OPERATION LINK((S) component 56 refers to explicit links between the present (source) operation and a destination (next) operation. Whenever the operation identified as the source operation completes, the operation identified as the destination operation is considered for possible execution. Evaluation for execution is accomplished using the CONDITIONAL LOGIC (CL) entity 58. CL entity 58 is used to decide which operations to consider for execution whenever the operation to which the CL entity belongs completes execution. It is comprised of a series of statements (STMT) 64 that include an EXPRESSION entity 70 which is evaluated, typically using the output results of the completed operation. For each statement that evaluates to a true condition, the list of operations held by that statement in the OPERATION ID entity 74 is returned for consideration for possible execution. If there is no CL entity for an operation, all operations identified as destination operations in the OPERATIONS LINK entity will be considered for possible execution.

An optional entity in transaction DAG structure 50 is the BROADCAST entity 62. The presence of BROADCAST entity 62 indicates that the operation is a broadcast operation and should be sent to more than one service application for processing. The optional subsections place success criteria on the broadcast operation to determine when to advance the operation as a whole. If RESPONSE entity 68 is present, a data value indicates that there are a minimum number of successful responses expected before this operation may be advanced. If EXPRESSION entity 70 is present, it specifies that an action should be performed and a value returned and evaluated before this operation may be advanced. An expression can be a simple value, a math operation, the value of a variable, or the return value of a function.

b. An Illustrated Implementation of a Transaction DAG.

Figure 6:
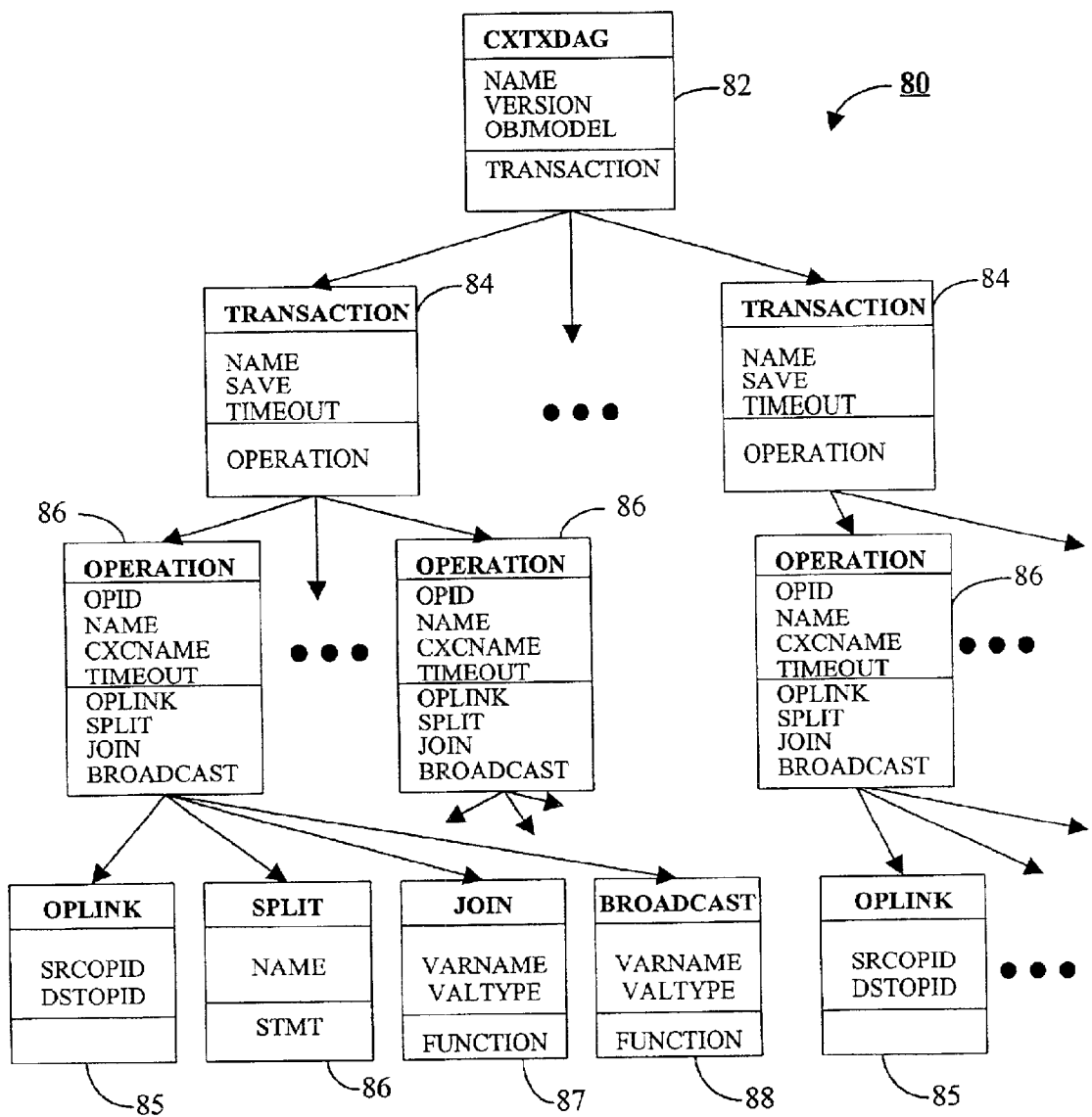
FIG. 6 schematically illustrates a first portion of the DTD of the XML document that functions as the transaction data structure according to an illustrated implementation of the present invention.
Figure 7:
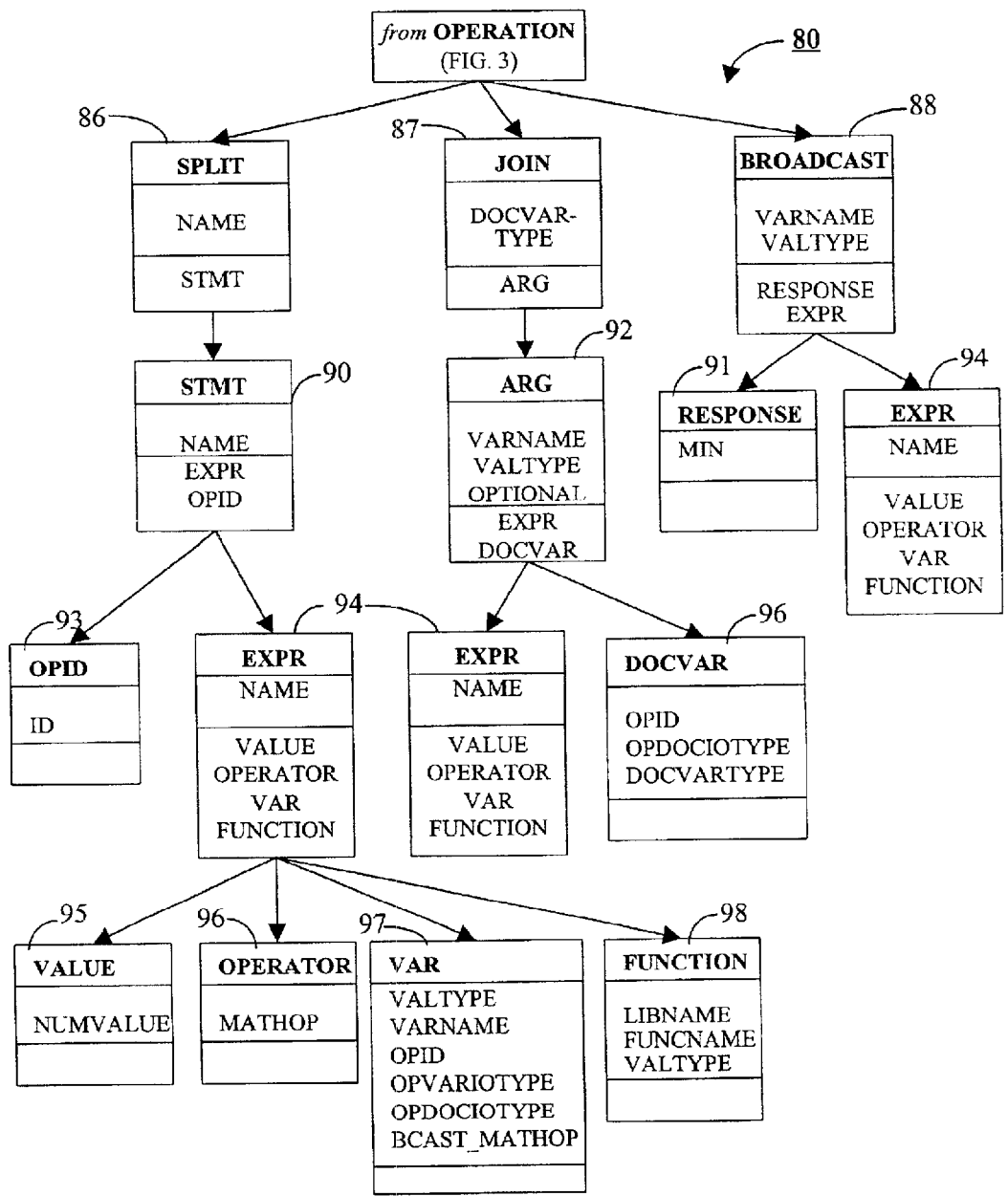
FIG. 7 schematically illustrates a second portion of the DTD of the XML document that functions as the transaction data structure according to an illustrated implementation of the present invention.

In an illustrated embodiment of the present invention, the transaction DAG data structure 82 has the structure of the document type definition (DTD) shown in Table 1 and illustrated in FIG. 6 and FIG. 7. The INPUT entity 60, CONDITIONAL LOGIC entity 58 and OPERATION LINK (S) entity 56 of FIG. 5 are referred to as JOIN section 87, SPLIT section 86, and OPLINK section 85, respectively, in Table 1 and in FIG. 6 and FIG. 7.

TABLE 1

```
<!DOCTYPE CXTXDAG          [
<!ELEMENT CXTXDAG          (TRANSACTION)*>
<!ATTLIST CXTXDAG
   NAME       CDATA        #REQUIRED
   VERSION    (1.0 | 2.0 | ...)   \"1.0\"
   OBJMODEL   (ECXpert | ...)     \"ECXpert\"
<!ELEMENT TRANSACTION      (OPERATION)*>
<!ATTLIST TRANSACTION
   NAME       CDATA        #REQUIRED
   TIMEOUT    CDATA        #IMPLIED
   SAVE       CDATA        #IMPLIED
>
<<!ELEMENT OPERATION       (OPLINK*| SPLIT | JOIN)>
<!ATTLIST OPERATION
   OPID       CDATA        #REQUIRED
   NAME       CDATA        #REQUIRED
   CXCNAME    CDATA        #REQUIRED
   BROADCAST  CDATA        #IMPLIED
   TIMEOUT    CDATA        #IMPLIED
>
<!ELEMENT OPLINK           EMPTY>
<!ATTLIST OPLINK
   SRCOPID    CDATA        #REQUIRED
   DSTOPID    CDATA        #REQUIRED
<!ELEMENT SPLIT            (STMT)*>
<!ATTLIST SPLIT
   NAME       CDATA        #REQUIRED
>
```

TABLE 1-continued

```
<!ELEMENT STMT             (EXPR, OPID+)*>
<!ATTLIST STMT
   NAME       CDATA        #REQUIRED
>
<!ELEMENT EXPR             (VALUE | OPERATOR | VAR | FUNCTION) *>
<!ATTLIST EXPR
   NAME       CDATA        #REQUIRED
>
<!ELEMENT OPID             EMPTY>
<!ATTLIST OPID
   ID         CDATA        #REQUIRED
>
<!ELEMENT OPERATOR         (VALUE | OPERATOR | VAR | FUNCTION) *>
<!ATTLIST OPERATOR
   MATHOP     CDATA        #REQUIRED
>
<!ELEMENT VAR              EMPTY>
<!ATTLIST VAR
   VARNAME    CDATA        #REQUIRED
   VALTYPE    CDATA        #IMPLIED
   OPID       CDATA        #IMPLIED
   INPUTDOC   CDATA        #IMPLIED
>
<!ELEMENT VALUE            EMPTY>
<!ATTLIST VALUE
   STRVALUE   CDATA        #IMPLIED
   NUMVALUE   CDATA        #IMPLIED
>
<!ELEMENT FUNCTION         EMPTY>
<!ATTLIST FUNCTION
   LIBNAME    CDATA        #REQUIRED
   FUNCNAME   CDATA        #REQUIRED
   VALTYPE    CDATA        #IMPLIED
>
<!ELEMENT JOIN             (FUNCTION | ARG*)>
<!ELEMENT ARG              (EXPR)>
<!ATTLIST ARG
   VARNAME    CDATA        #REQUIRED
   VALTYPE    CDATA        #IMPLIED
>
]>
``` c. Designing a Transaction and Specifying an Operation.

TRANSACTION section 84 is composed of one or more operations that are to be executed in the order specified under the conditions provided at each juncture. At the transaction level, the designer must provide a NAME for the transaction that must be unique across all transactions that are defined within the domain of CX server 10. The name of the transaction is used for instantiating run-time transactions of this type as the result of a Transaction Request Message 284 (FIG. 2). Optionally, the user may provide a TIMEOUT value for the transaction. If specified, this represents the maximum amount of time, in seconds, that a transaction has to complete execution once it has been started. If no value is provided, or a value of zero is provided, no timeout is assumed and the transaction may take as long as necessary to complete. The user defining the transaction definition may also optionally use the SAVE tag to specify whether or not to save transactions of this type to a data base of transactions (also referred to as the persistence server.) A value of YES for this field indicates that transactions of this type should be saved. If not specified, the default turns saving ON for this transaction type.

Examples of portions of transaction definitions are provided to illustrate how the transaction DAG structure is used. Example 1 defines a transaction whose name is "myTransaction" whose run-time instances should not be saved and can take at most 60 seconds to execute.

EXAMPLE 1

```
<TRANSACTION NAME="myTransaction" SAVE="NO"
TIMEOUT="60">
<!- Define operations here -->
</TRANSACTION>
```

Example 2 defines a transaction whose name is "anotherTransaction" whose run-time instances should be saved and has no maximum execution time restrictions.

EXAMPLE 2

```
<TRANSACTION NAME="anotherTransaction">
<!- Define operations here - ->
</TRANSACTION>
```

TRANSACTION section 84 points to OPERATION section 86. Each operation must specify a NAME, OPID, and CXCNAME, and optionally a TIMEOUT value. The name specifies the logical name of the operation, and will often correspond to the service application (CXC) that executes it. There are two reserved names for two required operations known as CXtsHeadop and CXtsTailOp. Every transaction must have a CXtsHeadOp and a CxtsTailOp; the CXtHeadOp is always the first operation in a transaction, and the CXtsTailOp is always the last. These operations are in addition to any operations that are to be included in the transaction. The OPID is a numeric value that must be unique within the transaction definition; no other operation within the transaction may have the same OPID value. The CXCNAME specifies the logical name of the CXC (service application) that can execute this operation. When the CXCNAME indicates a value of '*', any CXC which has registered with CX server 10 as being capable of executing this type of operation may be used. An operation may optionally specify a TIMEOUT value. If specified, this defines the maximum amount of time an operation can take to execute. If no value is provided, or a value of zero is provided, no timeout is assumed and the operation can take as long as necessary to complete. Table 2 provides additional information about each of the data entities in the Transaction and Operation sections of the DAG data structure.

TABLE 2

Transaction and Operation Sections

| Section Name | Tag Name | Required | Type | Default Value |
|---|---|---|---|---|
| TRANSACTION | Meaning: A transaction is a sequence of operations that are to be executed in a defined order under the given conditions. | | | |
| | NAME | Yes | Character | None |
| | Meaning: The name of the transaction. It will be used to refer to the type of transaction for instantiating run-time transactions of this type as the result of a Transaction Request Message. This name must be unique across all defined transactions. | | | |
| | TIMEOUT | No | Numeric | Zero |
| | Meaning: The maximum amount of time the transaction can take to execute, in seconds. if this tag is not present or the value is 0, this means there is no timeout value. | | | |
| | SAVE | No | character | YES |
| | Meaning: A flag which indicates whether or not to save transactions of this type to the persistence server. if present, any value other than 'YES' or 'yes' will turn saving off for run-time instances of transactions of this type. If not specified, a value of 'YES' is assumed. | | | |

TABLE 2-continued

Transaction and Operation Sections

| Section Name | Tag Name | Required | Type | Default Value |
|---|---|---|---|---|
| OPERATION | Meaning: An operation is a request to perform some action. The operation's operation request document is prepared according to the definition provided in the JOIN section. This operation request document is sent to the indicated CXC for an operation request. The resulting message for the CXC is stored as the operation response document. | | | |
| | NAME | Yes | Character | None |
| | Meaning: The name of the operation. This does not have to be unique across the transaction. It refers to the logical name given to this type of operation. There are two pre-defined operation names that must appear in every transaction definition: 'CXtsHeadOp' refers to the first operation in the transaction; 'CXtsTailOp' refers to the last operation in the transaction. | | | |
| | OPID | Yes | Numeric | None |
| | Meaning: A numeric value assigned to this particular operation. It must be unique within the transaction definition. | | | |
| | CXCNAME | Yes | Character | None |
| | Meaning: The name of the CXC which can execute this operation. If the value is an asterisk (*), then the CX will, at run-time, determine the CXC's which can execute this operation (this is often used for broadcast operations). If a specific name is provided, the CX will look for a CXC instance with that name and attempt to have that CXC execute this operation. | | | |
| | TIMEOUT | No | Numeric | Zero |
| | Meaning: The maximum time, in seconds, the operation has to complete execution. If no value is provided, or a value of zero is provided, no timeout is assumed. | | | |

Example 3 defines a simple operation whose name is "myOperation", has an ID of "1" which can be executed by the service application, "myCXC", and can take at most 60 seconds to execute.

EXAMPLE 3

```
<OPERATION NAME="myOperation" OPID="1"
CXCNAME="myCXC" TIMEOUT="60 />
```

Example 4 defines an operation whose name is "anotherOperation", has an ID of "3", whose CXC should be determined by the CX for each run-time instance, and has no restrictions on the amount of time it can take to execute.

EXAMPLE 4

```
<OPERATION NAME="anotherOperation" OPID="3"
CXCNAME="*"/>
```

OPERATION section 86 points to OPLINK section 85. A link between two operations is specified using an OPLINK section. Each OPLINK section includes a single SRCOPID tag and DSTOPID tag. There can be 1–n OPLINK sections per operation. The SRCOPID tag is the operation ID of the operation where the link starts, and the DSTOPID tag is the operation ID of the operation where the link ends. Although not required, it is good practice to have the SRCOPID match the OPID of the OPERATION section that contains the OPLINK section.

Operation links define the order of execution of the operations. When one operation completes its execution, the operation links specify the set of operations that may be executed as a result. An operation is ready for execution when all other operations that have forward links to this operation have completed execution. Note that this includes operations that are considered complete for any reason, including timeout, failure, or elimination due to split condition logic. If a split condition is specified, the conditions defined by that split condition must be evaluated to determine which of the links to follow. For more details see the section below entitled Specifying conditional operation flow (SPLIIT) logic. When defining a transaction, the first set of operations that should be executed must be linked as destination operations from the CXtsHeadOp operation. The final set of operations must all have CXtsTailOp as their destination operations in their operation links. The OPID of the CXtsHeadOp conventionally has a value of zero, although this is not mandatory. Table 3 provides additional information about each of the data entities in the OPLINK section of the DAG data structure.

TABLE 3

OPLINK Section

| Section Name | Tag Name | Required | Type | Default Value |
|---|---|---|---|---|
| OPLINK | Meaning: Defines a link between the named operations. Whenever the operation identified as the source operation completes, the operation identified as the destination operation is considered for possible execution. | | | |
| | SRCOPID | Yes | Numeric | None |
| | Meaning: The source operation in the link. The value should correspond to the OPID specified in the OPERATION section. | | | |
| | DSTOPID | Yes | Numeric | None |
| | Meaning: The destination operation in the link. This value must correspond to the OPID specified in the OPERATION section of the operation that is the desired destination operation. | | | |

Example 5 defines a simple linear transaction graph with three operations, Parse, Translate, and Gateway which are to be executed one after the other. In this example, the Parse operation has an ID of 1, the Translate operation has an ID of 2, and the Gateway operation has an ID of 3.

EXAMPLE 5

<OPERATION NAME="CXtsHeadOp" OPID="0" CXCNAME="Head">
<OPLINK SRCOPID="0" DSTOPID="1" />
</OPERATION>
<OPERATION NAME="Parse" OPID="1" CXCNAME="Parse">
<OPLINK SRCOPID="1" DSTOPID="2" />
</OPERATION>
<OPERATION NAME="Translate" OPID="2" CXCNAME="Translate">
<OPLINK SRCOPID="2" DSTOPID="3"/>
</OPERATION>
<OPERATION NAME="Gateway" OPID="3" CXCNAME="Gateway">
<OPLINK SRCOPID="3" DSTOPID="4" />
</OPERATION>
<OPERATION NAME="CXtsTailOp" OPID="4" CXCNAME="Tail">
</OPERATION>

Example 6 defines a transaction graph with concurrent operations where the first two operations are executed concurrently, followed by a third operation that is executed after those two complete.

EXAMPLE 6

<OPERATION NAME=1 CXtsHeadop" OPID="0" CXCNAME="Head">
<OPLINK SRCOPID="0" DSTOPID="1" />
<OPLINK SRCOPID="0" DSTOPID="2" />
</OPERATION>

EXAMPLE 6-continued

<OPERATION NAME="OP1A" OPID="1" CXCNAME="OP1ACXC">
<OPLINK SRCOPID="1" DSTOPID="3" />
</OPERATION>
<OPERATION NAME="OP1B" OPID="2" CXCNAME="OP1BCXC">
<OPLINK SRCOPID="2" DSTOPID="3" />
</OPERATION>
<OPERATION NAME="OP3" OPID="3" CXCNAME="OP3CXC">
<OPLINK SRCOPID="3" DSTOPID="4" />
</OPERATION>
<OPERATION NAME="CXtsTailOP" OPID="4" CXCNAME="Tail">
</OPERATION>

An operation may be specified as having up to three additional optional components. The operation may be defined as a Broadcast Operation, a set of Split conditions may be specified, and the method of preparing the operation request document to the operation, via a JOIN section, may be defined. Each of these is described in more detail below.

d. Specifying Conditional Operation Flow (SPLIT) Logic.

SPLIT section 86 is used whenever the decision about the next set of operations to execute depends upon some condition. SPLIT section 86 provides the conditional logic on which to base the decision about the operation(s) to consider for execution next, when the operation to which the SPLIT belongs completes execution. SPLIT section 86 is comprised of a set of STMT sections 90 (statement) which contain expressions to be evaluated. Within each STMT section is an expression section (EXPR) 94 and a set of operation ID sections 93 (OPID). An expression is some condition to evaluate; details about specifying an expression are provided in section g. below. The set of operation ID sections 93 indicate those operations that should be slated for execution if the condition specified by the expression evaluates to a true value (a non-zero value). The operation IDs specified in the STMT sections must match one of the operation IDs in the set of operation links (OPLINK) for the operation containing the split condition. If there is no SPLIT section for an operation, all operations identified as destination operations in the OPLINK section will be considered for possible execution. Table 4 provides additional information about each of the data entities in SPLIT section 86 of the DAG data structure.

TABLE 4

SPLIT Section

| Section Name | Tag Name | Required | Type | Default Value |
|---|---|---|---|---|
| SPLIT | Meaning: The SPLIT is used to decide which operations to consider for execution whenever the operation to which the SPLIT belongs completes execution. It is comprised of a series of statements (STMT) which are evaluated. For each statement that evaluates to a true condition, the list of operations held by that statement is returned for consideration for possible execution. If there is no SPLIT section for an operation, all operations identified as destination operations in the OPLINK section will be considered for possible execution. Any operation listed as part of a statement must also have been listed as a DSTOPID in an OPLINK for the OPERATION where the SPLIT is defined. | | | |
| STMT | | YES | | |
| | Meaning: A required subsection of a SPLIT section. It consists of an expression (EXPR) to be evaluated and a set of operation ID (OPID) sections listing the IDs of the operations to return if the expression evaluates to true. | | | |

TABLE 4-continued

SPLIT Section

| Section Name | Tag Name | Required | Type | Default Value |
|---|---|---|---|---|
| OPID | Meaning:. Holds the ID tag to indicate the ID of an operation to be returned if an expression evaluates to true in a split statement. | | | |
| | ID | Yes | Numeric | None |
| | Meaning: The ID of the operation to he returned if the expression in a split statement evaluates to true. | | | |

Example 7 defines a split condition in which the next operation should be executed only if the variable PROCEED is included in the output section of this operation's operation response document (More information about the EXPR section is provided below.)

EXAMPLE 7

```
<OPERATION NAME="MYOP"
OPID="1" CXCNAME="MYOPCXC">
<OPLINK SRCOPID="1" DSTOPID="2" />
<SPLIT>
<STMT>
<EXPR>
<VAR VALTYPE="NUMVALUE" VARNAME="PROCEED"
OPID="1"
OPVARIOTYPE="OUTPUT"
OPDOCIOTYPE="OUTPUT" />
</EXPR>
<OPID ID="2" />
</STMT>
</SPLIT>
</OPERATION>
<OPERATION NAME="ANOTHEROP" OPID="2"
CXCNAME="ANOTHERCXC">
</OPERATION>
``` e. Specifying Input Arguments using the JOIN Section.

JOIN section 87 is used to build the input arguments for operation request message 286 (FIG. 2) for the operation to which this JOIN logic belongs. JOIN processing is essentially the translation of one or more documents into the operation request document. The join may be defined to map entire documents (or specific sections) of one or more operations into the operation request document or specific variables. The join may specify that only the input sections be mapped, that only the output section be mapped, or that both the input and output sections be mapped.

All operations considered for execution will have their JOIN section executed to build the operation request document. If the JOIN fails, the operation will not be executed. If no JOIN is provided for a particular operation (i.e., no input arguments are specified), the default JOIN will consolidate the operation response documents 290 (FIG. 2) of all of the preceding operations that belong to this transaction into the operation request document for this operation. In particular, the default join maps all of the input and output variables of the previous operation(s) into the input and output sections of the operation request document for this operation. As previously noted, default behavior is implementation specific, and the Transaction DAG does not enforce this logic.

A join may be comprised of a series of argument sections (ARG) 92 which specify the value to be given to one or more specific named variables in the operation request document of the operation. The ARG section 92 consists of a series of tags defining the properties of the variable(s) in the operation request document and either an expression or document mapping to give the variable its value. Each variable is given a name (NAME) and a representation type (VALTYPE) along with an optional tag indicating if this variable is mandatory or optional (OPTIONAL). If no OPTIONAL tag is provided, or the value of the OPTIONAL tag is "NO" (or "no"), the variable is considered mandatory. If the OPTIONAL tag is present and its value is either "YES" (or "yes"), the variable is considered optional. This is used to determine how to proceed if the named variable cannot be given a value. If an optional variable is not available, the join can still succeed, provided that any other mandatory variables are available. If a mandatory variable is not available, the join is considered to have failed and the operation cannot be executed. Failure of the operation may, in turn, cause the entire transaction to fail. The variables may be given values based on the evaluation of some expression (EXPR) or from a mapped document, or specific section of a document.

When a function is to be executed, a user who defines a transaction may specify the JOIN translation in one of several ways. A user may define a dynamic library (DLL) and an entry point; the library is then loaded by CX server 10 and executed. The output of the entry point would be a single document. A user may alternatively provide Java classes for translation purposes, or may define a shell script mechanism. The shell script would get current documents as files and return the expected document in a location expected by CX server 10. Simple document translations may also be defined visually using a user interface mechanism for defining transactions. See Section 5.b. below for additional information about the user interface. Table 5 provides additional information about each of the data entities in JOIN section 87 of the DAG data structure.

TABLE 5

JOIN Section

| Section Name | Tag Name | Required | Type | Default Value |
|---|---|---|---|---|
| JOIN | Meaning: The JOIN is used to build the input arguments for an operation request message for the operation to which this join belongs. All operations considered for execution will have their JOIN section executed to build the operation request document. If the JOIN fails, the operation will not be executed. If no JOIN is provided, the default JOIN will consolidate all of the preceding operations' operation response documents into the operation request document for the operation. | | | |
| | DOCVAR-TYPE | No | Character | DOC |
| | Meaning: if present in the join, it defines whether the input section (INPUT), output section (OUTPUT), or both sections (DOC) of the documents are to be mapped to the operation request document for the join. This is used for joins where all of the previous operations' documents are to be merged to form the operation request document for the operation to which the join belongs. | | | |
| DOC-VAR | Meaning: Defines how the identified XML document should be mapped to the indicated argument (ARG). It defines the operation that contains the document, which of its two documents to use, and the relevant section(s) of the document to extract. | | | |
| | OPID | Yes | Numeric | None |
| | Meaning: The ID of the operation whose document is to be extracted. | | | |
| | OPDOCIO-TYPE | No | Character | INPUT |
| | Meaning: Defines whether the operation request document (INPUT) or operation response document (OUTPUT) should be extracted. | | | |
| | DOCVAR-TYPE | No | Character | DOC |
| | Meaning: Defines whether the input section (INPUT), output section (OUTPUT, or both sections (DOC) should be extracted. | | | |

TABLE 5-continued

JOIN Section

| Section Name | Tag Name | Required | Type | Default Value |
|---|---|---|---|---|
| ARG | | | | |
| | Meaning: An argument to add to the operation request document for this operation. It specifies the name and type of the argument along with a tag indicating if it is required or optional. The associated EXPR defines how to derive the value for this argument | | | |
| | VARNAME | Yes | Character | None |
| | Meaning: The name of the variable that will be added to the indicated section of the operation request document of this operation. Its value is determined by the expression associated with the argument. | | | |
| | VALTYPE | No | Character | NUMVALUE |
| | Meaning: The representation of the value. It can be either 'NUMVALUE' for numeric values, 'STRVALUE' for string values, or 'DOCVALUE' for document values. | | | |
| | OPTIONAL | No | Character | None |
| | Meaning: If present, it indicates if the JOIN argument is required to be in the operation request document or not if it is not present, it defaults to being required. If a required argument is not present, the JOIN will fail. If an optional argument is not present, the JOIN will proceed. | | | |

Example 7 defines a default join for an operation (OPID=3) which consolidates all of the variables in the preceding operations' operation response documents. In this example, two operations directly precede this operation (OPID=1 and OPID=2), and all of the variables in the operation response document for OPID=1 and OPID=2 would be mapped into the operation request document for OPID=3.

EXAMPLE 7

```
<OPERATION NAME="myOP1" OPID="1"
CXCNAME="myOPCXC">
<OPLINK SRCOPID="1" DSTOPID="3" />
</OPERATION>
<OPERATION NAME="anotherOp" OPID="2"
CXCNAME="anotherOPCXC">
<OPLINK SRCOPID="2" DSTOPID="3" />
</OPERATION>
<OPERATION NAME="thirdOP" OPID="3"
CXCNAME="thirdOPCXC">
</OPERATION>
```

Example 8 defines a join that maps the input variables of the previous operations to this operation's operation request document. In this example, only the variables in the INPUT section of the preceding operations' operation response document are mapped. The OUTPUT variables would not be mapped.

EXAMPLE 8

```
<OPERATION NAME="myOP1" OPID="1"
CXCNAME="myOPCXC">
<OPLINK SRCOPID="1" DSTOPID="3" />
</OPERATION>
<OPERATION NAME="anotherOP" OPID="2"
CXCNAME="anotherOPCXC">
<OPLINK SRCOPID="2" DSTOPID="3" />
</OPERATION>
<OPERATION NAME="thirdOP" OPID="3"
CXCNAME="thirdOPCXC">
<JOIN DOCVARTYPE="INPUTVARLIST">
</JOIN>
</OPERATION>
```

Example 9 defines a join that maps both the input and output variables of previous operations to this operation's operation request document. In this example, the variables in both the INPUT and OUTPUT sections of the preceding operations' operation response documents are mapped.

EXAMPLE 9

```
<OPERATION NAME="myOP1" OPID="1"
CXCNAME="myOPCXC">
<OPLINK SRCOPID="1" DSTOPID="3" />
</OPERATION>
<OPERATION NAME="anotherOP" OPID="2"
CXCNAME="anotherOPCXC">
<OPLINK SRCOPID="2" DSTOPID="3" />
</OPERATION>
<OPERATION NAME="thirdOP" OPID="3" CXCNAME="thirdCXC">
<JOIN DOCVARTYPE="VARLIST">
</JOIN>
</OPERATION>
```

Example 10 defines a join that maps the variables PRICE and QUANTITY from the operation response document of the operation with an ID of 2 to the input variable TOTAL where TOTAL=PRICE*QUANTITY. All of the variables are numeric. The variable, TOTAL, is mandatory.

EXAMPLE 10

```
<OPERATION NAME="MYOP" OPID="2" CXCNAME="MYCXC">
<JOIN>
<ARG VARNAME="TOTAL" VALTYPE="NUMVALUE">
<EXPR>
<OPERATOR MATHOP="SUM">
<VAR VALTYPE="NUMVALUE" VARNAME="PRICE" OPID="2" />
<VAR VALTYPE="NUMVALUE" VARNAME="QUANTITY"
OPID="2" />
</EXPR>
</ARG>
</JOIN>
</OPERATION>
```

Example 11 defines a join that maps a previous operation's operation response document (OPID=1) as a variable named "OP1OutputDoc." This variable is considered optional.

EXAMPLE 11

```
<OPERATION NAME="MYOP" OPID="2" CXCNAME="MYCXC">
<JOIN>
<ARG VARNAME="OP1OutputDoc" VALTYPE="DOC"
OPTIONAL="YES">
<DOCVAR OPID="1" OPDOCIOTYPE="OUTPUT"
DOCVARTYPE="DOC" />
</ARG>
</JOIN>
</OPERATION>
```

Example 12 defines a join that maps the minimum value of a variable, PRICE, from the operation response documents from a broadcast operation (OPID=1) as a variable, LowestPrice. This variable is considered mandatory.

EXAMPLE 12

```
<OPERATION NAME="MYOP" OPID="2" CXCNAME="MYCXC">
<JOIN>
<ARG VARNAME="LowestPrice" VALTYPE="NUMVALUE"
OPTIONAL="NO">
<EXPR>
<VAR VALTYPE="NUMVALUE" VARNAME="PRICE" OPID="1"
BCAST_MATHOP="MIN" />
```

EXAMPLE 12-continued

```
</EXPR>
</ARG>
</JOIN>
</OPERATION>
``` f. Specifying a Broadcast Operation.

A broadcast operation is a special type of operation in which more than one instance of the operation is executed. The decision as to how many instances to execute is a nm-time decision made by CX server 10 by sending operation requests to every CXC which has registered as capable of executing operations of this type. To specify an operation as a broadcast operation, a BROADCAST section 88 must be included. Within this BROADCAST section, the two optional subsections of RESPONSE 91 and EXPR 94 may be provided.

If the RESPONSE section is present, the MIN tag specifies the minimum number of responses required to be received before advancing past this operation. If no RESPONSE section is defined, the default is that all operation requests sent on behalf of this broadcast operation must be received before the operation as a whole can be advanced.

If the EXPR section is present, this indicates an expression that must be evaluated against each response received to determine if it should be counted toward the minimum. If no EXPR section is present, all responses received will be counted toward the minimum (if a minimum is specified). See the section, Specifying an Expression, for more information about expressions. Table 6 provides additional information about each of the data entities in BROADCAST section 88 of the DAG data structure.

TABLE 6

BROADCAST Section

| Section Name | Tag Name | Required | Type | Default Value |
|---|---|---|---|---|
| BROADCAST | Meaning: If present, indicates the operation is a broadcast operation. The optional subsections can place success criteria on the broadcast operation to determine when to advance the operation as a whole. | | | |
| RESPONSE | Meaning: If present, indicates there is a minimum number of successful responses expected before this operation can be advanced | | | |
| | MIN | Yes | Numeric | None |
| | Meaning: The minimum number of successful responses required for advancement. If present, the value must be greater than zero. | | | |

Example 13 defines a broadcast operation where the number of requests is to be determined at run-time. The name of the operation is "myBroadcast" and its ID is 1.

EXAMPLE 13

```
<OPERATION NAME="myBroadcast" OPID="1" CXCNAME="*">
<BROADCAST />
</OPERATION>
```

Example 14 defines a more complex broadcast operation where the minimum number of responses is 1 and the response should contain a variable, PRICE, with a value less than 10 to be considered successful.

EXAMPLE 14

```
<OPERATION NAME="myBroadcast" OPID="1" CXCNAME="*">
<BROADCAST>
<RESPONSE MIN="1" />
<EXPR>
<OPERATOR MATHOP="LT">
<VAR VALTYPE="NUMVALUE" VARNAME="PRICE" OPID="1"
OPVARIOTYPE="OUTPUT"
OPDOCIOTYPE="OUTPUT"/>
<VALUE NUMVALUE="10" />
</OPERATOR>
</EXPR>
</BROADCAST>
</OPERATION>
``` g. Specifying an Expression.

The EXPR section 94 is used for split conditions, for determining values for arguments in a JOIN, and for defining BROADCAST advance criteria. An expression may be a simple value (VALUE) 95, an operation (OPERATOR) 96, a function (FUNCTION) 98, or the value of a specified variable (VAR) 97. When an expression is a simple value, whenever the expression is evaluated, it always returns the configured value. The VALUE parameter of the EXPR section could be used to initialize some variable in an operation to a configured value. An expression may be defined as the value of a named variable using the VAR tag. Whenever the expression is evaluated, the value of the named variable is returned, or an error is returned if the variable could not be found. Using the VAR tag in an expression also requires the following additional information: the name (VARNAME) of the variable; the ID of the operation that contains the variable (OPID); the document that contains the variable (OPDOCIOTYPE); the section of that document that contains the variable (OPDOCVARTYPE); and the representation type of the value (VALTYPE).

An expression may be a math operation (OPERATOR) applied to one or more variables. Supported math operations include the most commonly used operations such as greater than, equal to, less than, plus, minus and multiplication. All of the math operations, with the exception of 'PLUS', can only be applied to numeric values (VALTYPE= "NUMVALUE"). Note that math operations do not work on document values. An expression may also be defined to return the result of executing a named function. A function as an expression requires the name of the function (FUNCNAME), the path and library where the function is defined (LIBNAME) and the type of value returned by the function (VALTYPE). When evaluated, the EXPR section returns the evaluation result, or an indication of an error if the expression could not be evaluated. An error occurs if the desired variable or function is not available or the expression was not correctly defined. Table 7 provides additional information about each of the data entities in EXPR section 94 of the DAG data structure.

TABLE 7

EXPR Section

| Section Name | Tag Name | Required | Type | Default Value |
|---|---|---|---|---|
| EXPR | Meaning: A specification to perform some action and return the value. An expression can be a simple value, a math operation, the value of a variable, or the return value of a function. | | | |

TABLE 7-continued

EXPR Section

| Section Name | Tag Name | Required | Type | Default Value |
|---|---|---|---|---|
| VALUE | Meaning: The expression should return the specified value whenever it is evaluated. | | | |
| | NUMVALUE | Yes | Numeric | None |
| | Meaning: The actual value to be returned. | | | |
| OPERATOR | Meaning: An action to perform on the indicated variables. With the exception of 'PLUS', operators only apply to numeric values. PLUS can be used to concatenate two string values. | | | |
| | MATHOP | Yes | Character | None |
| | Meaning: The math operation to perform on the indicated variables. if there is one VAR section, the following operations are supported: MINUS (reverses the sign of the value) if there are exactly two VAR sections, the following math operations are supported. PLUS (addition), MINUS (subtraction or sign reversal), TIMES (multiplication), DIV (division), MOD (modulus), GT (greater than), GE (greater than or equal to), LT (less than), LE (less than or equal to), EQ (equivalence), AND (and two numbers), OR (or two numbers). If there are more thin two VAR sections, the following operations are supported: MIN (return the minimum of all the values), MAX (return the maximum of all the values), AVG (return the average of all the values). | | | |
| VAR | Meaning: Specifies a variable. It is used to identify a variable from an existing document | | | |
| | VALTYPE | No | Character | NUMVALUE |
| | Meaning: The representation of the value. It can be either 'NUMVALUE' for numeric values, 'STRVALUE' for string values, or 'DOCVALUE' for document values. | | | |
| | VARNAME | Yes | Character | None |
| | Meaning: The name of the variable to locate. | | | |
| | OPID | No | Numeric | None |
| | Meaning: The ID of the operation which contains the desired variable. If this tag is not present, the OPID defaults to a predetermined value. | | | |
| | OPVARIO-TYPE | No | Character | INPUT |
| | Meaning: The location in the document where the variable is located. The default is 'INPUT' which indicates the variable is in the input section. The Other possible value is 'OUTPUT' which indicates the variable is in the Output section of the document. | | | |
| | OPIDOCIO-TYPE | No | Character | INPUT |
| | Meaning: The document that contains the desired variable. This can either be the operation request document (INPUT) or the operation response document (OUTPUT) of the indicated operation. | | | |
| | BCAST_MATHOP | No | Character | None |
| | Meaning: This must be specified if the operation identified by OPID is a broadcast operation. It indicates how to treat the values held by each broadcast instance. Since only one value can be mapped to a variable, this describes the math operation to perform to determine that value. The supported operations are SUM (to add up all of the values), MIN (to return the minimum of all the values), MAX (to return the maximum of all the values), and AVG (to return the average of all the values). | | | |
| FUNCTION | Meaning: If present, indicates an external function should be executed for this expression. | | | |
| | LIBNAME | Yes | Character | None |
| | Meaning: The path and name of the library which contains the desired function. | | | |
| | FUNCNAME | Yes | Character | None |
| | Meaning: The name of the function to execute. | | | |
| | VALTYPE | No | Character | NUMVALUE |
| | Meaning: The type of value returned by the function. It can be either 'NUMVALUE' for numeric values, 'STRVALUE' for string values, or 'DOCVALUE' for document values. | | | |

Example 15 defines an expression that always returns the value of 10.

EXAMPLE 15

```
<EXPR>
<VALUE NUMVALUE="10" />
</EXPR>
```

Example 16 defines an expression in which two numbers are added together from the input section of the operation request document of the operation whose OPID is 1.

EXAMPLE 16

```
<EXPR>
<OPERATOR MATHOP="PLUS">
<VAR VALTYPE="NUMVALUE" VARNAME="VAR1" OPID="1" />
<VAR VALTYPE="NUMVALUE" VARNAME="VAR2" OPID="1" />
</OPERATOR>
</EXPR>
```

Example 17 defines an expression as a function called "myFunc" which is found in the library at location "/usr/local/lib/myLib.so" and returns a numeric value.

EXAMPLE 17

```
<EXPR>
<FUNCTION FUNCNAME="myFunc"
LIBNAME="/usr/local/lib/myLib.so"
VALTYPE="NUMVALUE" />
</EXPR>
```

4. Operation of the Transaction Service.

Figure 8:
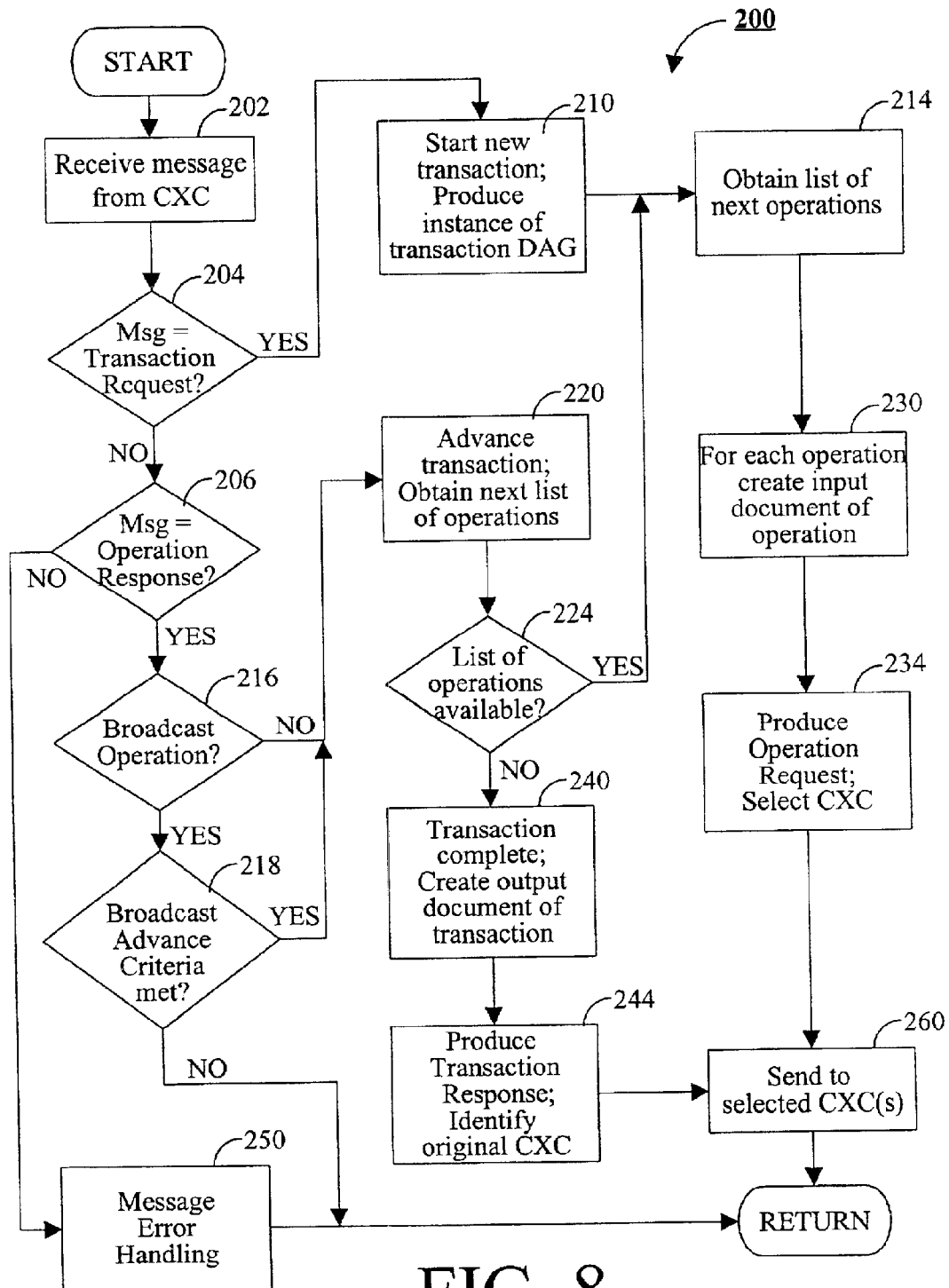
FIG. 8 is a flowchart illustrating transaction processing as performed by the transaction service of FIG. 2 and using the transaction definition data structure of FIG. 5, according to an illustrated implementation of the present invention.

The general functions of transaction processing service 200 of FIG. 2 are illustrated in the flowchart of FIG. 8. These functions are described below with reference to the components shown in FIG. 2. CX server 10 receives messages from requesting applications and service applications. CX server 10, after handling message protocol functions, passes these received messages to transaction service 200 in box 202. CX server 10 uses transaction service 200 to track a transaction thread, to traverse transaction logic and to perform transaction execution. Transaction service 200 provides a set of service interfaces with conditionals and mapping of DOM objects for working with the transaction logic. The service interfaces include those shown in Table 8.

TABLE 8

| API | Function |
|---|---|
| CreateTransaction | creates a transaction instance |
| StartTransaction | starts execution of a transaction instance |
| EndTransaction | ends execution of a transaction instance |
| AdvanceTransaction | advances a transaction instance by executing a next list of operations |

TABLE 8-continued

| API | Function |
| --- | --- |
| GetTransaction | gets a transaction object |
| RetryTransaction | retries or re-executes selected transaction operations |
| RestartTransaction | restart from the beginning the selected transaction |
| SuspendTransaction | halt execution of an active transaction |
| ResumeTransaction | resume execution of an active transaction |
| AbortTransaction | Halt, permanently, execution of an active transaction |
| GetInputMsg | gets the input XML document of a transaction or operation |
| GetOutputMsg | gets the output XML document of a transaction or operation |

As shown in FIG. 2, transaction service 200 handles four types of messages; it may receive transaction request messages 284 and operation response messages 290, and it may send operation request messages 286 and transaction response messages 294.

Transaction service 200 first determines what kind of message has been received in the query boxes 204 and 206. If the message is neither one, control passes to a message error handling procedure 250 and processing control returns to CX server 10. If the message is a transaction request message 284, this is a new transaction, and control passes from box 204 to box 210, where transaction service 200 calls the StartTransaction interface to create a new transaction instance associated with a unique identifier, referred to as the transaction ID, and to start transaction execution. Creating a new transaction includes calling CreateTransaction to retrieve the transaction definition 282 that matches the transaction name in request message 284 from transaction definition database 296, and producing the directed acyclic graph that represents the transaction instance. Transaction service 200 then begins traversing the transaction instance graph by obtaining a list of operations for execution, in box 214, using the SPLIT logic of the head operation. For each operation in the operation list, transaction service 200 calls GetInputMSG to create the input document(s) for the operation, in box 230, using the information specified in the JOIN section for the operation, and produces the operation request document 286, in box 234. For each operation, transaction service determines the service application name of the service application that is to perform the operation, using the CXCNAME tag. Then, transaction service 200 returns the operation request document(s) CX server 10 for sending to their respective service applications, in box 260, and control returns to CX server 10.

If the incoming message is not a transaction request, as determined in box 204, transaction service 200 queries whether it is an operation response 286 received from a service application, in box 206. If the message is an operation response, transaction service 200 updates the transaction state. Each operation response message contains the transaction ID, the operation name and the output results produced by the service application, and is stored in a data store for later access and processing. The transaction state changes every time an operation response message is received.

Transaction service 200 then determines, in box 216, whether the operation response message is in response to a broadcast operation. A broadcast operation may involve invoking more than one service application to perform the operation. In the illustrated implementation of transaction service 200, the criteria for advancing to a next operation node is to wait until all responses to operations associated with the node are received. To determine whether a broadcast operation is completed, the RESPONSE, MIN and EXPR tags are used to determine how to process operation response messages. As noted earlier, if the RESPONSE section is present, the MIN tag specifies the minimum number of responses required to be received before advancing past this operation. If no RESPONSE section is defined, the default is that all operation requests sent on behalf of this broadcast operation must be received before the operation as a whole can be advanced. If the EXPR section is present, this indicates an expression that must be evaluated against each response received to determine if it should be counted toward the minimum. If no EXPR section is present, all responses received will be counted toward the minimum, if a minimum has been specified. Collectively these rules may be referred to as the broadcast advance criteria. If the query in box 216 determines that this operation response message is in response to a broadcast operation, then Transaction service 200, in box 218, queries whether the broadcast advance criteria have been met, and if so, control proceeds to box 220 to advance the transaction. If broadcast advance criteria have not been met, then this operation node is not complete, the transaction cannot be advanced, and control is returned to CX server 10.

If the message is an operation response message and there is no pending broadcast operation, transaction service 200 calls AdvanceTransact ion procedure in box 220. Transaction service 200 then calls GetTransaction to update the transaction instance's state information, and then evaluates the SPLIT logic of the operation associated with this operation response message to obtain the next list of operations from the transaction instance graph. Transaction service 200 queries, in box 224, whether there is a next operations list available. If a next list of operations is available, then CX server 10 still has more operations to perform for this transaction, and the transaction may be advanced to have the appropriate service application(s) perform the next operations. Transaction service 200 ensures that none of the operations in the list of next operations has a predecessor operation that is still pending and has not yet completed. Control passes to boxes 230, 234 and 260 where the next operation request message(s) are produced and sent out, as described above.

If the query in box 224 indicates that there is no next operations list, the transaction has been completed (assuming that the incoming message is not in error). This means that the operation response message just received is for an operation whose SPLIT logic or OPLINK section points to the required tail operation in the transaction instance. The tail operation node is available as the next operation in the next operation list. Control then passes to boxes 240 and 244 where the transaction response message is created. The JOIN logic of the tail operation node contains the transaction response document format expected by the requesting (originating) application. Transaction service 200 calls GetOutputMSG to obtain the output document for the transaction, produces the transaction response message using this document format, identifies the requesting application and then sends the transaction response message to that application in box 260.

Transaction service 200 also supports transaction timer, purging, logging and recovery mechanisms that are not shown in FIG. 8. The timer mechanism allows transaction service 200 to discontinue processing of this transaction if operation responses are not received in a timely manner.

When operation responses are not received after retries and a waiting period, the transaction instance is ended (i.e., removed from memory) and is marked as a timeout transaction in the data store of transactions. Creating a timer for each operation, if needed, is accomplished during AdvanceTransaction procedure 220. When transactions end, there is a purging mechanism to remove the transaction object from all transaction lists.

Transaction logging involves saving the transaction instance, sufficient run time information, and transaction state changes to enable transaction recovery if a first CX server 10 is no longer operational and a backup CX server assumes transaction processing. The following transaction data elements are saved during transaction logging: the transaction instance, the transaction request message, the transaction response message (if any), and transaction attributes including the transaction ID, the transaction DAG name, transaction state information, the originating requesting application identifier and name. Operation information saved includes operation request messages, operation response messages, the operation identifier (OPID), operation state information, and broadcast operation information (e.g., number of service applications requested and number of operations pending). Executing CXCs are saved as well. Transaction recovery may be done at the individual transaction level or for all transactions started by CX server 10.

5. Transaction Tools.

a. Test Transaction Template.

Table 9 provides a transaction that may be used as a template to test the interface between a service application (referred to as a CXC) and transaction service 200 of CX server 10. Transaction definition line<CXTXDAG NAME="TsGraph" identifies this XML document as containing a transaction definition. Transaction definition line <TRANSACTION NAME="TX-Template"> identifies the start of a transaction definition section for a transaction called "TX-Template". TX-Template is the name to be used in the transaction request document to request a transaction of this type to be executed. The template transaction is a simple linear transaction with a total of three operations identified by the OPID tag as operations 0, 1 and 2. The operations identified with OPID=0 and OPID=2 and having names "CxtsHeadOp" and "CxtsTailop" indicate the head and tail operations, respectively, required in all transactions. The transaction definition line <OPLINK SRCOPID="0" DSTOPID="1" specifies that the operation having OPID=1 is the destination operation of the head operation, and so is the first "real" operation to be performed. Thus, whenever a transaction request document is received requesting a transaction called "TX-Template", the first operation to be executed is OPID=1, which requests the CXC being tested to perform its function. The transaction definition line </OPERATION> indicates the end of an operation definition.

TABLE 9

```
<CXTXDAG NAME="TsGraph"
<TRANSACTION NAME="TX-Template"
<OPERATION OPID="0" NAME="CxtsHeadOp" CXCNAME="Head">
<OPLINK SRCOPID="0" DSTOPID="1" /
</OPERATION>
<!-- The operation below should be customized to the
CXC being tested. -- >
<!-- The following must be specified in the OPERATION
section to complete this transaction definition. -->
<!-- * NAME - name of the operation. Typically, this
is the same as the name of your CXC; and -->
```

TABLE 9-continued

```
<!-- * CXCNAME of the CXC. This is the name of the
CXC being tested. -->
<OPERATION OPID="1" NAME="cxc-template-op-1"
CXCNAME="*">
<OPLINK SRCOPID="1" DSTOPID="2" />
<JOIN DOCVARTYPE="VARLIST"></JOIN>
</OPERATION>
<OPERATION OPID="2" NAME="CXtsTailOp" CXCNAME=" ">
<JOIN DOCVARTYPE="VARLIST"></JOIN>
</OPERATION>
</TRANSACTION>
</CXTXDAG>
```

The operation definition for OPID=1 further specifies the name of the operation, "cxc-template-op-1", and the name of the CXC designated to perform the operation. Typically, the NAME and CXCNAME fields will have the same value. So, for example, if the CXC to be executed is named 'Parse', the line would read:

<OPERATION OPID="1" NAME="Parse" CXCNAME="Parse">

The JOIN tag identifies how this <JOIN> operation should build its operation request document. In this case, this type of join will map all of the variables in the data section of the transaction request document into the data section of the operation request document. For example, assume the transaction request document has the following data section:

```
<DATA>
<INPUT>
<FILENAME NAME="myTestFile.txt" />
<MAPNAME NAME="myMap.txt" />
</INPUT>
<OUTPUT></OUTPUT>
</DATA>
```

Then, the data section of the operation request document would look like:

```
<DATA>
<INPUT>
<FILENAME NAME="myTestFile.txt" />
<MAPNAME NAME="myMap.txt" />
</INPUT>
<OUTPUT></OUTPUT>
</DATA>
```

The operation request document for operation 1 is then sent to the CXC being tested. The transaction definition line <OPLINK SRCOPID="1" DSTOPID="2" specifies that the operation having OPID=2 is the destination operation of operation 1, and so is to be performed after completion of operation 1.

A service application has access to a library of interfaces, referred to as the CXsdk, to interact with CX server 10. The interfaces enable a custom-built application to include the application logic for the function of the CXC. The interfaces also provide for a service application to connect to CX server 10, to register itself as a CXC to sign up for an operation, and to send and receive messages. The CXsdk library also includes the XML parsing and constructing tools. The service CXC uses one of these interfaces to extract any needed variables from the operation request document it receives from CX server 10. The CXC then performs the function it has been configured to do. After completing its function, the CXC issues an operation response document, using the CXsdk, and sends that document back to CX server 10, and to operation 2, the tail operation, in the transaction graph of the TX-Template transaction.

The role of the tail operation is to build the transaction response document that is sent back to the CXC that requested the transaction providing information about the transaction that just executed. The join section for operation 2 identifies how to build the transaction response document. In this case, this type of join will map all of the variables in the data section of the operation response document from operation OPID=1. CX server 10 then sends the transaction response document back to the requesting CXC. Finally, the transaction definition lines </TRANSACTION> and </CXTXDAG> respectively identify the end of the transaction definition for TX-Template, and the end of the XML document b. Producing Transaction Definitions.

A user interface application may be provided with CX server 10 for a user to design and specify a transaction definition. A user may construct a transaction visually by selecting from among operations that are available, according to their descriptions. The user interface may provide assistance to the user when specifying a unique identifier for the transaction definition. In addition, the user must identify the input and output DTD's of the transaction. The user interface may operate in one of two modes. The first is simply as a data entry tool for capturing the transaction definition. The second mode of operation allows for the user interface to validate the correctness of the definition dynamically, by connecting to the CX server.

6. The Machine and Software Product of the Invention.

Figure 9:
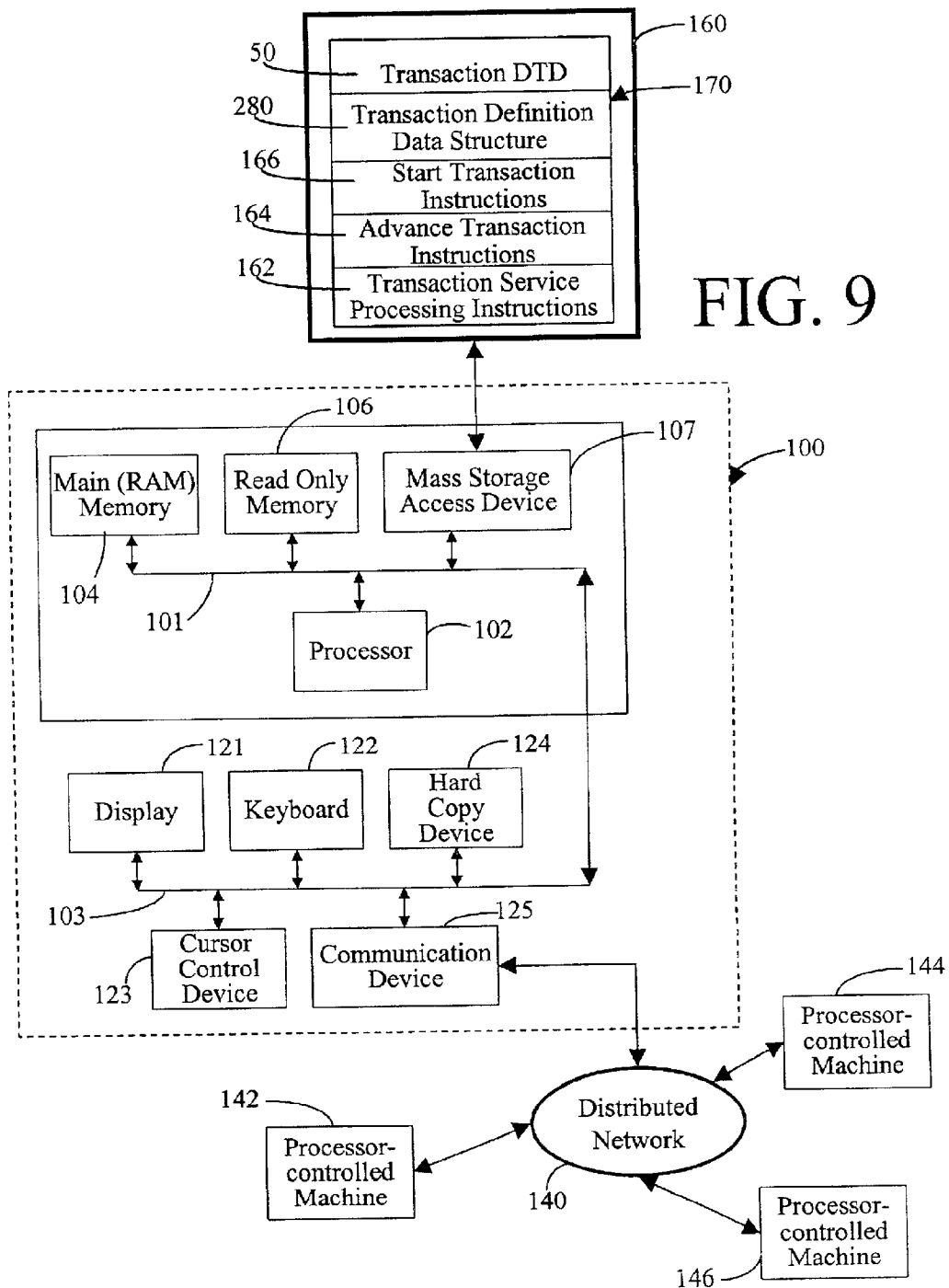
FIG. 9 is a simplified block diagram illustrating a distributed computer network including several processor-controlled machines, showing the components of one suitably configured processor-controlled machine in which the present invention may be used, and further illustrating the software product of the present invention and its use in conjunction with a machine in the network.

FIG. 9 is a block diagram of distributed network 140 that includes processor-controlled machines 142, 144, 146 and 100. The component parts of machine 100 have been enlarged to schematically illustrate a machine in which the present invention may be used. Machine 100 is an example of a processor-controlled machine that may be used to implement commerce exchange server 10 of FIG. 1 including transaction service 200 which utilizes the transaction DAG data structure of the present invention. Similarly, any one of the processor-controlled machines 142, 144 and 146 may implement one of machines 20, 22 or 24 of FIG. 1 that include a service application or one of machines 32 or 36 that include a client application of the commerce network illustrated in FIG. 1. While the present invention may be used in any machine having the common components, characteristics, and configuration of machine 100, the invention is not inherently related to any particular processor, machine, system or other apparatus. The machine or system may be specially constructed and optimized for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody or make use of the present invention, the machine is not a standard or known configuration. In the claims, machine 100 is referred to as a "computer" for purposes of simplifying the claim language, but the term "computer" is intended to include any and all machines as described and shown in FIG. 9 and is not intended to limit the scope of machine 100 in any way.

Machine 100 includes a bus or other internal communication means 101 for communicating information, and a processor 102 coupled to bus 101 for processing information. Machine 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. Machine 100 also comprises a read only memory (ROM) and/or static storage device 106 coupled to bus 101 for storing static information and instructions for processor 102, and a data mass storage access device 107 such as a magnetic disk drive or optical disk drive. Data mass storage access device 107 is coupled to bus 101 and is typically used with a computer readable mass storage medium 160, such as a magnetic or optical disk, for storage of information and instructions. Machine 100 may include more than one storage access device 107. For example, machine 100 may include both a storage access device for a non-removable medium such as an internal magnetic (hard) disk and a mass storage access device for a removable medium such as an optical CD-ROM, a magnetic floppy disk, a PC-card, or magnetic tape.

Machine 100 may, but need not, include a conventional display device 121 capable of presenting images, such as a cathode ray tube or a liquid crystal display (LCD) device or any other device suitable for presenting images. Display device 121 is coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control device 123, such as a mouse, a trackball, stylus, electronic tablet, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. Note that the actual manner in which the physical components of machine 100 are connected may vary from that shown in FIG. 9. The manner of connection may include hardwired physical connections between some or all of the components, as well as connections over wired or wireless communications facilities, such as through remote or local communications networks and infrared and radio connections. Note further that not all of the components of machine 100 shown in FIG. 9 may be required to carry out the functions of commerce exchange server 10 or to make use of the transaction DAG data structure of the present invention. Those of ordinary skill in the art will appreciate that various configurations of machine 100 may be used to carry out a particular implementation of commerce exchange server 10 or the transaction DAG data structure. For example, machine 100 may be a Workgroup Enterprise server machine manufactured by Sun Microsystems, Inc. of Mountain View Calif. that includes one or more Ultra SPARC™ processors, and that operates using the Solaris™ operating system. Machine 100 further includes communication, or network interface, device 125, coupled to bus 101 through bus 103, for use in sending data to and receiving data from other nodes of distributed network system 140 according to standard network protocols. This communication device 125 may include any of a number of commercially available networking peripheral devices such as those used for coupling to an Ethernet, token ring, Internet, or wide area network.

Processor 102, together with an operating system, operates to execute instructions (e.g., program code) to produce and use data. The program code and data may reside in main memory (RAM) 104, in read only memory 106, on the non-removable hard disk storage accessed by storage access device 107, or even on another processor-controlled machine connected to network 140. The program code and data may also reside on a removable medium that is loaded or installed onto machine 100 when needed by means of a storage access device 107 suitable for that purpose. When program code (i.e., software) implementing commerce exchange server 10 is stored in a memory device accessible to processor 102, machine 100 is configured to perform the functions of commerce exchange server 10 of FIG. 1, and, in particular, to process transactions having the structured format illustrated in FIG. 5 or FIG. 6 and FIG. 7. An input transaction request message, such as transaction request message 284 of FIG. 2, is provided from communication device 125 and is forwarded via data bus 103 to bus 101 for storage in main memory 104 for later access by processor 102. Processor 102 executes program instructions, included in one of the above-described memory components, that implement operation 200 of FIG. 8. During execution of the instructions, processor 102 accesses memory 104 or 106 to obtain or store data necessary for performing its operations. For example, when machine 100 is configured to perform operation 500 of FIG. 8, processor 102 may access transaction DTD 50 (FIG. 5) or transaction DTD 80 (FIG. 6 and FIG. 7) in memory 104 in order to perform the functions of transaction service 200 starting a new transaction instance.

FIG. 9 also shows software and data structure product 160, an article of manufacture that can be used in a machine that includes components like those shown in machine 100. Software and data structure product 160 includes data storage medium 170 which stores instructions, also referred to as program code or computer readable code, for executing operations that process transactions as defined by the present invention, such as operation 200 of FIG. 8. Data storage medium 170 also stores one or more data structures, such as Transaction DAG 50 of FIG. 5 for use in producing transaction instances and executing transactions. As used herein, a "data storage medium" covers one or more distinct units of a medium that together store a body of data Examples of data storage media include magnetic media such as floppy disks, diskettes, magnetic tape, and PC cards (also previously known as PCMCIA memory cards), optical media such as CD-ROMs, and semiconductor media such as semiconductor ROMs and RAMs. By way of example, a set of magnetic disks or optical CD-ROMs storing a single body of data would be a data storage medium.

Software and data structure product 160 may be commercially available to a purchaser or user in several forms. In one typical form, software and data structure product 160 is commercially available in the form of a shrink-wrap package that includes data storage medium 170 and appropriate documentation describing the product. In that case, data storage medium 170, also referred to as a computer-readable medium, is a physical medium that stores one or more data structures or instruction data that is accessed by storage medium access device 107 or its equivalent. "Storage medium access device" is a device that can access data stored on a data storage medium. Storage medium access device 107 may be contained in a distinct physical device into which data storage medium 170 is inserted into, mounted on, or otherwise installed into, in order for the storage medium access device to access and retrieve the data stored thereon. Examples of storage medium access devices include disk drives, CD-ROM readers, and DVD devices. A storage medium access device may be physically separate from machine 100, or enclosed as part of a housing of machine 100 that includes other components. Mass storage device 107 may also be remotely located (not shown) as part of some other processor-controlled machine, such as a server, on network 140. Mass storage device 107 may provide instructions retrieved from medium 170 to processor 102 via bus 101, causing processor 102, when executing the instructions, to process transactions in accordance with the teachings herein. Mass storage device 107 may provide one or more data structures retrieved from medium 170 to processor 102 via bus 101, for use in processing transactions in accordance with the teachings herein. If device 107 is remotely located, program instructions and data structures are provided from storage medium 170 to processor 102 of machine 100 by way of communication device 125 from network 140.

Software and data structure product 160 may also be commercially or otherwise available to a user in the form of a data stream indicating instruction data for processing transactions or one or more data structures for use in processing transactions in accordance with the teachings herein. The data stream is transmitted to the user over a communications facility from a remotely-located storage device. In this case, article 160 is embodied in physical form as signals stored on the remotely-located storage device; the user accesses the contents of data storage medium 170 in order to purchase or otherwise obtain a copy of those contents, but typically does not purchase or acquire any rights in the actual remotely-located storage device. When software product 160 is provided in the form of a data stream transmitted to the user over a communications facility from the remotely-located storage device, instruction data and data structures stored on data storage medium 170 are accessible via communications device 125. Alternatively, a data stream transmitted to the user over a communications facility from the remotely-located storage device may be stored in some suitable local memory device of machine 100 or a data storage medium 107 locally accessible to processor 102 using bus 101.

FIG. 9 illustrates various examples of how data storage medium 170 may be configured. Software and data structure product 160 may include one or more of the types of data illustrated in FIG. 9. For example, data storage medium 170 may be configured with transaction definition data structure 280 of FIG. 2 and transaction DTD data structure 50 of FIG. 5 for use by transaction service 200 for producing a transaction instance DAG data structure and executing a transaction according to the process flow in FIG. 8. When implementing the specific illustrated embodiment of CX server 10 and transaction service 200 described herein, data storage medium 170 would be configured with transaction DAG data structure 80 of FIGS. 6 and 7.

Data storage medium 170 may also be configured with transaction service processing instruction data 162 for performing operation 200 (FIG. 8). FIG. 9 shows representative examples of the functional components of instruction data 162 such as advance transaction instructions 164 and start transaction instructions 166. The instruction data 162, 164 and 166 is provided to processor 102 for execution when transaction service processing is to be performed. For example, when instructions 162 are provided to processor 102, and processor 102 executes them, machine 100 is operated to perform the operations for starting or advancing a transaction, processing a broadcast transaction, producing operation request messages, or producing a transaction response message, according to operation 200 of FIG. 8. Note also that when software and data structure product 160 comprises the entire commerce exchange server application 10 of FIG. 1, data storage medium 170 may include additional instruction data (not shown) for carrying out operations 12, 14, 19 and 400 of CX server 10.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A computer-implemented method for performing a transaction in a network distributed system comprising the steps of:

produced a transaction instance data structure indicating a plurality of operations constituting a transaction; the transaction instance data structure indicating a linking of the plurality of operations to indicate an operation performance order; the transaction instance data structure further indicating conditioning logic data for changing the operation performance order such that the plurality of operations is capable of being performed in more than one possible order; and for each of the plurality of operations;

producing an operation request message indicating input data for performing an operation;

sending the operation request message to a service application to perform the operation using the input data;

receiving an operation response message from the service application indicating output data from the operation; and determining a next operation to perform using the conditioning logic data and the output data of the operation response message.

2. The computer-implemented method of claim 1 for performing a transaction wherein the conditioning logic data indicates at least one of a mathematical expression, a function, and a variable data item; and wherein the step of determining the next operation to perform using the conditioning logic data and the output data of the operation response message includes using the output data to evaluate the at least one of the mathematical expression, the function, and the variable data item.

3. The computer-implemented method of claim 1 for performing a transaction wherein the operation request message and the operation response message include extensible markup language (XML) tags indicating data items.

4. The computer-implemented method of claim 1 for performing a transaction wherein the transaction instance data structure is a directed acyclic graph (DAG) including a plurality of nodes; each operation being represented by a node; the nodes being arranged in the transaction instance DAG such that paths through the transaction instance DAG indicate the more than one possible order in which the plurality of operations may be performed; and wherein performing the transaction further includes traversing a path through the plurality of nodes of the transaction instance DAG.

5. The computer-implemented method of claim 4 for performing a transaction wherein the path through the graph is determined at runtime.

6. The computer-implemented method of claim 1 for performing a transaction further including receiving a transaction request message indicating a request to perform the transaction from a requesting application residing on a first computer included in a distributed network; and wherein the service application resides on a second computer included in the distributed network.

7. The computer-implemented method of claim 6 wherein the distributed network is the Internet.

8. An article of manufacture comprising a data storage medium having computer readable instruction data embodied therein; the computer readable instruction data indicating instructions executed by a processor in a processor-controlled machine for managing transaction processing message flow among a plurality of requesting application programs and service application programs resident on a plurality of processor-controlled machines in a distributed network systems; the computer readable instructions in the article of manufacture comprising:

a first portion of instructions which when executed causes the processor to produce a transaction instance data structure indicating a plurality of operations constituting a transaction; the transaction instance data structure indicating a linking of the plurality of operations to indicate an order of execution; the transaction instance data structure further indicating conditioning logic data conditioning execution of at least one operation such that the plurality of operations is capable of being performed in more than one possible order; and a second portion of instructions which when executed causes the processor, for each of the plurality of operations, to produce an operation request message indicating input data for performing an operation, to send the operation request message to a service application to perform the operation using the input data, to receive an operation response message from the service application indicating output data from the operation, and to determine a next operation to perform using the conditioning logic data and the output data of the operation response message.

9. The article of claim 8 wherein the conditioning logic data indicates at least one of a mathematical expression, a function, and a variable data item; and wherein the second portion of instructions further includes a third portion of instructions which, when executed, causes the processor, for each of the plurality of operations, to use the output data to evaluate the at least one of the mathematical expression, the function, and the variable data item in order to determine the next operation to perform.

10. The article of claim 8 wherein the transaction instance data structure is a directed acyclic graph (DAG) including a plurality of nodes; each operation being represented by a node; the nodes being arranged in the transaction instance DAG such that paths through the transaction instance DAG indicate the more than one possible order in which the plurality of operations may be performed; and wherein the article further includes a third portion of instructions which, when executed, causes the processor to traverse a path through the plurality of nodes of the transaction instance DAG.

* * * * *

UNITED STATES PATENT AND TRADEMARK OFFICE
CERTIFICATE OF CORRECTION

PATENT NO.    : 6,971,096 B1
DATED         : November 29, 2005
INVENTOR(S)   : Lakshmi Narasimha Ankireddipally et al.

It is certified that error appears in the above-identified patent and that said Letters Patent is hereby corrected as shown below:

Column 1,
Line 12, delete "9,772,216" and insert -- 6,772,216 --.

Column 42,
Line 20, delete "systems" and insert -- system --.

Signed and Sealed this

Sixteenth Day of May, 2006

JON W. DUDAS
*Director of the United States Patent and Trademark Office*